US012266302B2

(12) United States Patent
Chen et al.

(10) Patent No.: US 12,266,302 B2
(45) Date of Patent: Apr. 1, 2025

(54) PIXEL CIRCUIT, DRIVING METHOD THEREFOR, AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Yipeng Chen, Beijing (CN); Ling Shi, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/802,129

(22) PCT Filed: Aug. 27, 2021

(86) PCT No.: PCT/CN2021/115004
§ 371 (c)(1),
(2) Date: Mar. 2, 2023

(87) PCT Pub. No.: WO2023/024072
PCT Pub. Date: Mar. 2, 2023

(65) Prior Publication Data
US 2024/0212601 A1 Jun. 27, 2024

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ............... G09G 3/3233; G09G 3/3266; G09G 3/32961; G09G 3/3275; G09G 2300/0819;
(Continued)

(56) References Cited

U.S. PATENT DOCUMENTS

2015/0262525 A1* 9/2015 Cha .......................... G09G 3/20
345/212
2018/0130424 A1* 5/2018 Gao .................... H01L 27/1251
(Continued)

FOREIGN PATENT DOCUMENTS

CN 106128360 A 11/2016
CN 107316606 A 11/2017
(Continued)

*Primary Examiner* — Dong Hui Liang
(74) *Attorney, Agent, or Firm* — Ling Wu; Stephen Yang; Ling and Yang Intellectual Property

(57) ABSTRACT

A pixel circuit includes a drive sub-circuit, a write sub-circuit, a compensation sub-circuit, a first reset sub-circuit, a second reset sub-circuit and a light-emitting element. The drive sub-circuit is configured to provide a drive signal to a third node in response to signals of the first node and the second node; the write sub-circuit is configured to write the signal of the data signal line to the second node or the third node under a control of a signal of a first scanning signal line; the compensation sub-circuit is configured to compensate a voltage at the first node under the control of the signal of the first scanning signal line.

17 Claims, 11 Drawing Sheets

(52) U.S. Cl.
CPC ............... *G09G 2300/0861* (2013.01); *G09G 2320/0233* (2013.01); *G09G 2320/0247* (2013.01); *G09G 2340/0435* (2013.01)

(58) Field of Classification Search
CPC ... G09G 2300/0842; G09G 2300/0861; G09G 2300/0426; G09G 2300/08; G09G 2300/0852; G09G 2320/0233; G09G 2320/0247; G09G 2320/0223; G09G 2310/0251; G09G 2310/0262; G09G 2310/061; G09G 2310/0267; G09G 2340/0435
See application file for complete search history.

(56) References Cited

U.S. PATENT DOCUMENTS

| | | | | |
|---|---|---|---|---|
| 2018/0308427 | A1 | 10/2018 | Zhang et al. | |
| 2020/0074935 | A1* | 3/2020 | Wang ................... | G09G 3/3291 |
| 2020/0410937 | A1* | 12/2020 | Chen .................... | G09G 3/3233 |
| 2021/0375198 | A1 | 12/2021 | Zhang et al. | |
| 2022/0199004 | A1* | 6/2022 | Yao .......................... | G09G 3/32 |

FOREIGN PATENT DOCUMENTS

| | | | |
|---|---|---|---|
| CN | 111599282 | A | 8/2020 |
| CN | 111696486 | A | 9/2020 |
| CN | 111768739 | A | 10/2020 |
| IN | 111489701 | A | 8/2020 |
| JP | 2003-288055 | A | 10/2003 |

* cited by examiner

PIXEL CIRCUIT, DRIVING METHOD THEREFOR, AND DISPLAY APPARATUS

CROSS-REFERENCE TO RELATED APPLICATION

This application is a national stage application of PCT Application No. PCT/CN2021/115004, which is filed on Aug. 27, 2021 and entitled "Pixel Circuit, Driving Method therefor, and Display Apparatus", the content of which is incorporated herein by reference in its entirety.

TECHNICAL FIELD

Embodiments of the present disclosure relate to, but are not limited to, the field of display technologies, and in particular to a pixel circuit, a driving method therefor, and a display apparatus.

BACKGROUND

Organic light-emitting Diodes (OLEDs) are active light-emitting display devices having advantages of self-luminescence, a wide viewing angle, a high contrast ratio, low power consumption, an extremely high response speed, etc., and have been widely used in display products such as mobile phones, tablet computers, and digital cameras. OLED displaying is current-driven, and requires a current to be output to an OLED by a pixel circuit to drive the OLED to emit light.

SUMMARY

The following is a summary of subject matters described herein in detail. The summary is not intended to limit the protection scope of claims.

Exemplary embodiments of the present disclosure provide a pixel circuit, a driving method therefor and a display apparatus. The pixel circuit includes a drive sub-circuit, a write sub-circuit, a compensation sub-circuit, a first reset sub-circuit, a second reset sub-circuit and a light-emitting element. The drive sub-circuit is configured to provide a drive signal to a third node in response to signals of the first node and the second node; the write sub-circuit is configured to write the signal of the data signal line to the second node or the third node under a control of a signal of a first scanning signal line; the compensation sub-circuit is configured to compensate a voltage at the first node under the control of the signal of the first scanning signal line; the first reset sub-circuit is configured to reset the first node under a control of a signal of the reset control signal line; the second reset sub-circuit is configured to reset an anode terminal of the light-emitting element under a control of a signal of a second scanning signal line.

In an exemplary embodiment, the first reset sub-circuit includes a first transistor. A control electrode of the first transistor is connected with the reset control signal line, a first electrode of the first transistor is connected with a first power line or a reference power line, and a second electrode of the first transistor is connected with the first node.

In an exemplary embodiment, the second reset sub-circuit includes a second transistor. A control electrode of the second transistor is connected with the second scanning signal line, a first electrode of the second transistor is connected with an initial signal line, and a second electrode of the second transistor is connected with the anode terminal of the light-emitting element.

In an exemplary embodiment, the compensation sub-circuit includes a third transistor and a first capacitor, the drive sub-circuit includes a fourth transistor, and the write sub-circuit includes a fifth transistor. a control electrode of the third transistor is connected with the first scanning signal line, a first electrode of the third transistor is connected with the third node, and a second electrode of the third transistor is connected with the first node; one terminal of the first capacitor is connected with the first node, and another terminal of the first capacitor is connected with an anode terminal of the light-emitting element; a control electrode of the fourth transistor is connected with the first node, a first electrode of the fourth transistor is connected with the second node, and a second electrode of the fourth transistor is connected with the third node; and a control electrode of the fifth transistor is connected with the first scanning signal line, a first electrode of the fifth transistor is connected with the data signal line, and a second electrode of the fifth transistor is connected with the second node.

In an exemplary embodiment, the compensation sub-circuit includes a third transistor and a first capacitor. The drive sub-circuit includes a fourth transistor, and the write sub-circuit includes a fifth transistor. A control electrode of the third transistor is connected with a first scanning signal line, a first electrode of the third transistor is connected with a second node, and a second electrode of the third transistor is connected with the first node. One terminal of the first capacitor is connected with the first node, and another terminal of the first capacitor is connected with an anode terminal of the light-emitting element. A control electrode of the fourth transistor is connected with the first node, a first electrode of the fourth transistor is connected with the second node, and a second electrode of the fourth transistor is connected with the third node. A control electrode of the fifth transistor is connected with the first scanning signal line, a first electrode of the fifth transistor is connected with the data signal line, and a second electrode of the fifth transistor is connected with the third node.

In an exemplary embodiment, the pixel circuit further includes a first light-emitting control sub-circuit and a second light-emitting control sub-circuit. The first light-emitting control sub-circuit is configured to write a signal of a first power line to the second node under a control of a signal of a light-emitting control signal line, and the second light-emitting control sub-circuit is configured to form a current path between the third node and the anode terminal of the light-emitting element under the control of the signal of the light-emitting control signal line.

In an exemplary embodiment, the first light-emitting control sub-circuit includes a sixth transistor and the second light-emitting control sub-circuit includes a seven transistor; a control electrode of the sixth transistor is connected with the light-emitting control signal line, a first electrode of the sixth transistor is connected with the first power line, and a second electrode of the sixth transistor is connected with the second node; and a control electrode of the seventh transistor is connected with the light-emitting control signal line, a first electrode of the seventh transistor is connected with the third node, and a second electrode of the seventh transistor is connected with the anode terminal of the light-emitting element.

In an exemplary embodiment, the pixel circuit further includes a first light-emitting control sub-circuit and a second light-emitting control sub-circuit, wherein the first reset sub-circuit includes a first transistor and the second reset sub-circuit a second transistor; the compensation sub-circuit includes a third transistor and a first capacitor, the drive sub-circuit includes a fourth transistor, the write sub-circuit includes a fifth transistor, the first light-emitting control sub-circuit includes a sixth transistor, and the second light-emitting control sub-circuit includes a seventh transistor;

A control electrode of the first transistor is connected with a reset control signal line, a first electrode of the first transistor is connected with a first power line or a reference power line, and a second electrode of the first transistor is connected with the first node; a control electrode of the second transistor is connected with a second scanning signal line, a first electrode of the second transistor is connected with an initial signal line, a second electrode of the second transistor is connected with a fourth node, and the fourth node is connected with an anode terminal of the light-emitting element; the control electrode of the third transistor is connected with the first scanning signal line, the first electrode of the third transistor is connected with the third node or the second node, and the second electrode of the third transistor is connected with the first node. One terminal of the first capacitor is connected with the first node, and another terminal of the first capacitor is connected with the fourth node; the control electrode of the fourth transistor is connected with the first node, the first electrode of the fourth transistor is connected with the second node, and the second electrode of the fourth transistor is connected with the third node; a control electrode of the fifth transistor is connected to the first scanning signal line, a first electrode of the fifth transistor is connected with the data signal line, and a second electrode of the fifth transistor is connected with the second node or the third node; a control electrode of the sixth transistor is connected with a light-emitting control signal line, a first electrode of the sixth transistor is connected with the first power line, and a second electrode of the sixth transistor is connected with the second node; a control electrode of the seventh transistor is connected with the light-emitting control signal line, a first electrode of the seventh transistor is connected with the third node, and a second electrode of the seventh transistor is connected with the fourth node.

In an exemplary embodiment, the first to seventh transistors are all N-type transistors or P-type transistors.

In an exemplary embodiment, all of the second transistor, and the fourth transistor to the seventh transistor are low temperature poly silicon thin film transistors, and both of the first transistor and the third transistor are indium gallium zinc oxide thin film transistors.

In an exemplary embodiment, the reset control signal line, the first scanning signal line, and the second scanning signal line are further configured to receive signals at different frequencies according to a display mode of a display panel.

In an exemplary embodiment, receiving the signals at different frequencies according to the display mode of the display panel includes: when the display panel is in a first display mode, a data refresh frequency of the pixel circuit is a first frequency, and the reset control signal line, the first scanning signal line and the second scanning signal line are configured to receive signals at a first frequency; and when the display panel is in a second display mode, the data refresh frequency of the pixel circuit is a second frequency, the reset control signal line and the first scanning signal line are configured to receive a signal at a second frequency, and the second scanning signal line is configured to receive a signal at a third frequency, wherein the third frequency is higher than the second frequency, and the first frequency is higher than the second frequency.

In an exemplary embodiment, the signal of the first reset control signal line and the signal of the first scanning signal line are cascaded signals.

In an exemplary embodiment, the second reset sub-circuit includes a second transistor and an eighth transistor. A control electrode of the second transistor is connected with the second scanning signal line, a first electrode of the second transistor is connected with an initial signal line, and a second electrode of the second transistor is connected with the anode terminal of the light-emitting element. A control electrode of the eighth transistor is connected with a third scanning signal line, a first electrode of the eighth transistor is connected with the anode terminal of the light-emitting element, and a second electrode of the eighth transistor is connected with the compensation sub-circuit.

In an exemplary embodiment, the pixel circuit further includes a first light-emitting control sub-circuit and a second light-emitting control sub-circuit, wherein the first reset sub-circuit includes a first transistor and the second reset sub-circuit a second transistor and an eighth transistor; the compensation sub-circuit includes a third transistor and a first capacitor, the drive sub-circuit includes a fourth transistor, the write sub-circuit includes a fifth transistor, the first light-emitting control sub-circuit includes a sixth transistor, and the second light-emitting control sub-circuit includes a seventh transistor;

A control electrode of the first transistor is connected with a reset control signal line, a first electrode of the first transistor is connected with a first power line or a reference power line, and a second electrode of the first transistor is connected with the first node; a control electrode of the second transistor is connected with a second scanning signal line, a first electrode of the second transistor is connected with an initial signal line, a second electrode of the second transistor is connected with a fourth node, and the fourth node is connected with an anode terminal of the light-emitting element; the control electrode of the third transistor is connected with the first scanning signal line, the first electrode of the third transistor is connected with the third node or the second node, and the second electrode of the third transistor is connected with the first node. One terminal of the first capacitor is connected with the first node, and another terminal of the first capacitor is connected with a second terminal of the eighth node; the control electrode of the eighth transistor is connected with a third scanning signal line, a first electrode of the eighth transistor is connected with the fourth transistor; the control electrode of the fourth transistor is connected with the first node, the first electrode of the fourth transistor is connected with the second node, and the second electrode of the fourth transistor is connected with the third node; a control electrode of the fifth transistor is connected to the first scanning signal line, a first electrode of the fifth transistor is connected with the data signal line, and a second electrode of the fifth transistor is connected with the second node or the third node; a control electrode of the sixth transistor is connected with a light-emitting control signal line, a first electrode of the sixth transistor is connected with the first power line, and a second electrode of the sixth transistor is connected with the second node; a control electrode of the seventh transistor is connected with the light-emitting control signal line, a first electrode of the seventh transistor is connected with the third node, and a second electrode of the seventh transistor is connected with the fourth node.

In an exemplary embodiment, the signal of the third scanning signal line is the same as the signal of the second scanning signal line when the display panel is in a refresh stage; when the display panel is in a retention stage, the signal of the third scanning signal line is opposite to the signal of the second scanning signal line; or, when the display panel is in the retention stage, the signal of the third scanning signal line turns off the eighth transistor constantly.

An exemplary embodiment of the present disclosure also provides a display apparatus, which includes any above-mentioned pixel circuit.

A driving method of a pixel circuit is also provided according to an exemplary embodiment of the present disclosure, which is used to drive the pixel circuit provided according to any one of the preceding embodiments. The pixel circuit operates in a first display mode or a second display mode. The first display mode includes a plurality of first display periods. In one of the plurality of first display periods, the driving method therefor includes the following acts. In a reset stage, a first reset sub-circuit resets a first node under a control of a signal of a reset control signal line; and a second reset sub-circuit resets an anode terminal of a light-emitting element under a control of a signal of a second scanning signal line. In a data writing stage, a write sub-circuit writes a signal of a data signal line to a second node or a third node under a control of a signal of a first scanning signal line, and a compensation sub-circuit compensates a voltage at the first node under the control of the signal of the first scanning signal line; and in a light-emitting stage, a drive sub-circuit provides a drive signal to the third node in response to signals of the first node and the second node.

In an exemplary embodiment, the second display mode includes a plurality of second display periods, wherein the second display period comprises a refresh stage and a retention stage; the refresh stage includes a reset stage, a data writing stage and a light-emitting stage which are arranged sequentially; the retention stage includes a plurality of light-emitting stages and a plurality of light-off stages, which are arranged at intervals; in the light-off stage, the second reset sub-circuit resets the anode terminal of the light-emitting element under the control of the signal of the second scanning signal line.

Other aspects may be comprehended upon reading and understanding the drawings and detailed descriptions.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of various components in the drawings are not drawn to actual scales, and are only intended to schematically illustrate contents of the present disclosure.

DETAILED DESCRIPTION

Figure 1:
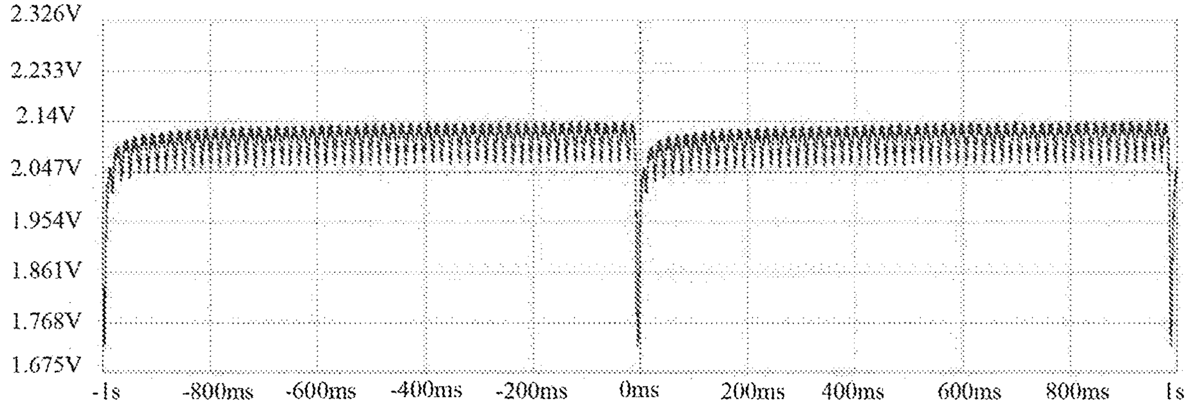
FIG. 1 is a schematic diagram of the jump waveform of a screen brightness voltage varying with time when data is refreshed in a low frequency mode.

Embodiments of the present disclosure will be described in detail below with reference to the drawings. It is to be noted that implementations may be implemented in a number of different forms. Those of ordinary skills in the art may easily understand such a fact that embodiments and contents may be transformed into various forms without departing from the purpose and scope of the present disclosure. Therefore, the present disclosure should not be explained as being limited to contents described in following implementations only. The embodiments of the present disclosure and features in the embodiments may be combined randomly with each other if there is no contradiction.

Unless otherwise defined, technical terms or scientific terms used in the embodiments of the present disclosure should have usual meanings understood by those of ordinary skill in the art to which the present disclosure pertains. "First", "second", and similar terms used in the embodiments of the present disclosure do not represent any order, quantity, or importance, but are only used for distinguishing different components. "Include", "contain", or a similar term means that an element or object appearing before the term covers an element or object listed after the term and equivalent thereof and does not exclude other elements or objects.

In the embodiments of the present disclosure, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, a first electrode may be the drain electrode, and a second electrode may be the source electrode. Or, the first electrode may be the source electrode, and the second electrode may be the drain electrode. In cases that transistors with opposite polarities are used, a current direction changes during operation of a circuit, or the like, functions of the “source electrode” and the “drain electrode” are sometimes interchangeable. Therefore, the “source electrode” and the “drain electrode” are interchangeable in the present specification.

In this specification, a “connection” includes a case where constitute elements are connected with each other through an element having some electrical effect. The “element with a certain electrical effect” is not particularly limited as long as electrical signals may be sent and received between the connected constituent elements. Examples of the “element with a certain electrical effect” not only include electrodes and wirings, but also include switch elements such as transistors, resistors, inductors, capacitors, other elements with various functions, etc.

OLED display apparatuses are commonly recognized as the most potential display apparatuses due to various advantages such as self-luminescence, low driving voltage, high light-emitting efficiency, short response time, wide usage temperature range, etc. OLEDs are classified into Passive Matrix OLEDs (PMOLEDs) and Active Matrix OLEDs (AMOLEDs) according to drive modes. There are multiple pixels arranged in an array in an AMOLED display apparatus, wherein each pixel is driven by a pixel driving circuit to emit light. For a dynamic picture, a refresh frequency of the picture may be increased to improve the display quality. For some relatively still pictures, high-frequency refreshing is unnecessary, therefore refresh frequencies of the pictures may be reduced to save power consumption of the display apparatus. In order to achieve characteristics of both high-frequency refreshing and low power consumption of the AMOLED display apparatuses, it’s needed for the AMOLED display apparatuses to support dynamic frequency refreshing.

At present, Always On Display (AOD) becomes a required function of many portable devices such as smart phones and smart watches. In an AOD mode, information displayed in a picture is time and simple information, and there is no need to refresh the picture at a high rate. Since the AOD occupies relatively long use time of a user, low-frequency refreshing is conducive to reducing the power consumption of the device and prolonging service life of a battery.

In a pixel circuit using a Low Temperature Poly Oxide (LTPO) technology, a switch Thin Film Transistor (TFT) connected with a control electrode of a Drive Thin Film Transistor (DTFT) is replaced with a low-leak oxide TFT. Since the leak of the oxide TFT may be $10^{-16}$ A or even lower, brightness of an OLED varies merely within a long time (more than 0.1 s, or even more than 1 s). Therefore, low-frame-frequency displaying and high brightness retention may be realized.

As shown in FIG. 1, it’s assumed that a driving frequency in a conventional low-frequency operation mode is 1 Hz, so that . . . 1 s, 0 s and 1 s . . . are all data update moments. At these moments, a data update frame may be refreshed to a control electrode of a Drive transistor (DTFT), thereby controlling a driving current flowing through an OLED. Time except the data update moments belongs to a brightness retention stage. At that time, anode high-frequency reset is not performed, it can be seen that the brightness at boundaries of frame periods drops obviously, which is easy to be detected by human eyes, representing the screen flicker.

Figure 2:
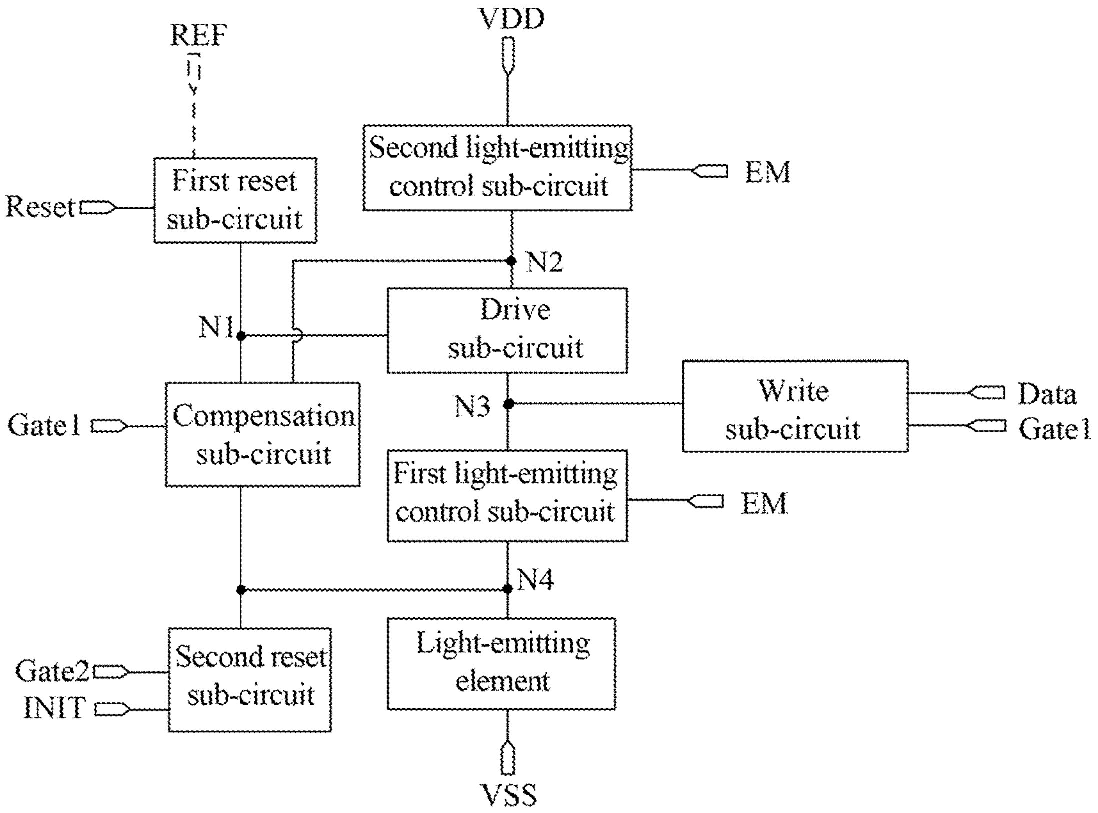
FIG. 2 is a schematic diagram of a structure of a pixel circuit according to an embodiment of the present disclosure.
Figure 3:
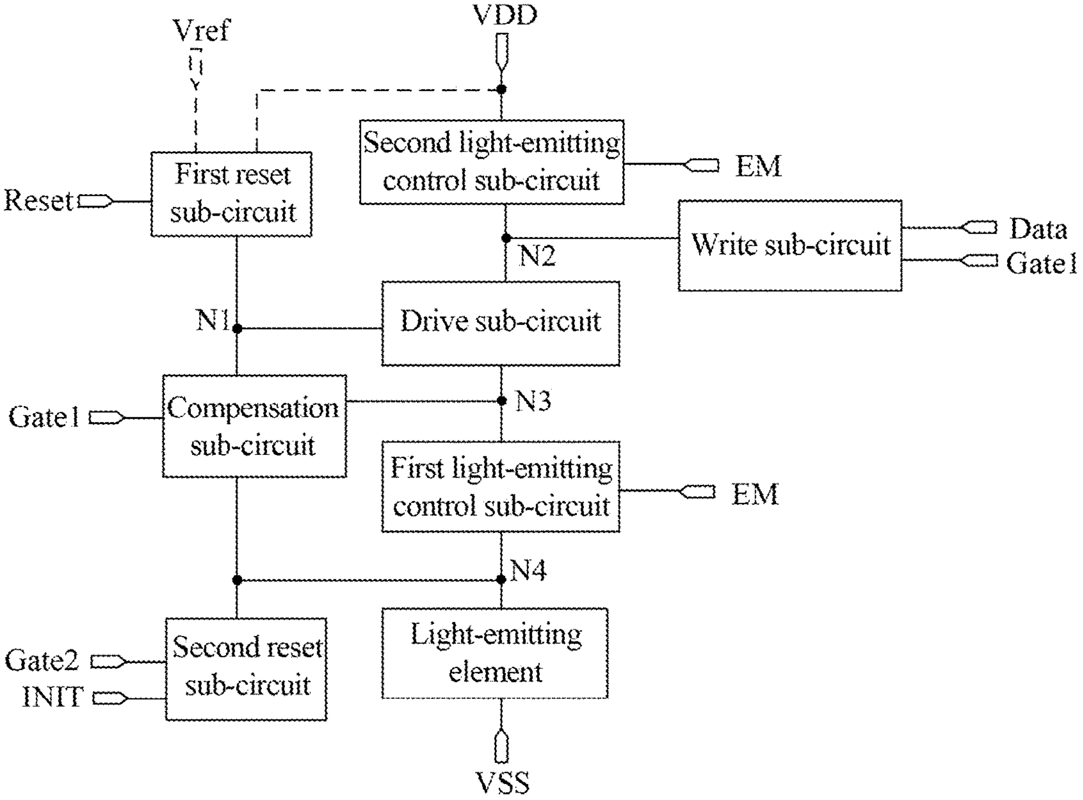
FIG. 3 is a schematic structural diagram of another pixel circuit according to an embodiment of the present disclosure.

According to an embodiment of the present disclosure, a pixel circuit is provided. FIGS. 2 and 3 are schematic diagrams of structures of pixel circuits according to embodiments of the present disclosure. As shown in FIGS. 2 and 3, a pixel circuit provided in an embodiment of the present disclosure includes a drive sub-circuit, a write sub-circuit, a compensation sub-circuit, a first reset sub-circuit, a second reset sub-circuit and a light-emitting element.

The drive sub-circuit is connected with a first node N1, a second node N2 and a third node N3 respectively, and is configured to provide a drive signal to the third node N3 in response to signals of the first node N1 and the second node N2. For example, the drive signal is a drive current.

The write sub-circuit is connected with a first scanning signal line Gate1 and a data signal line Data, is also connected with the second node N2 or the third node N3 and is configured to write a signal of the data signal line Data to the second node N2 or the third node N3 under a control of a signal of the first scanning signal line Gate1.

The compensation sub-circuit is connected with the first scanning signal line Gate1, the first node N1 and a fourth node N4 respectively, and is also connected with the third node N3 or the second node N2. The compensation sub-circuit is configured to compensate a threshold voltage of the drive sub-circuit to the first node N1 under the control of the signal of the first scanning signal line Gate1.

The first reset sub-circuit is connected with a reset control signal line Reset and the first node N1, respectively, and is also connected with a reference signal line REF or a first power line VDD. The first reset sub-circuit is configured to reset the first node N1 using a signal of the reference signal line REF or the first power line VDD under a control of a signal of the reset control signal line Reset.

The second reset sub-circuit is connected with a second scanning signal line Gate2, an initial signal line INIT, and an anode terminal (i.e., a fourth node N4) of the light-emitting element, respectively, and is configured to reset the anode terminal of the light-emitting element using a signal of the initial signal line INIT under a control of a signal of the second scanning signal line Gate2.

In the pixel circuit provided according to the embodiment of the present disclosure, the first reset sub-circuit uses the signal of the reference signal line REF or the first power line VDD to reset the first node N1 under the control of the signal of the reset control signal line Reset, the second reset sub-circuit uses the signal of the initial signal line INIT to reset the anode terminal of the light-emitting element under the control of the signal of the second scanning signal line Gate2, thereby realizing the reset of the first node N1 and the anode terminal of the light-emitting element respectively, prolonging reset time and improving the image sticking problem.

Figure 4:
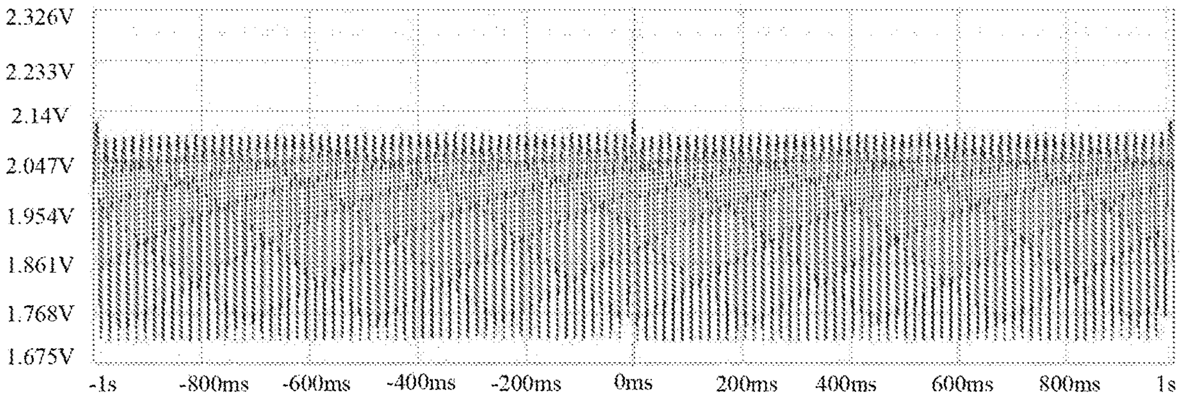
FIG. 4 is a schematic diagram of a screen brightness voltage varying with time when a pixel circuit according to an embodiment of the present disclosure is in a low frequency mode.

In a low-frequency brightness retention stage, in the pixel circuit according to the embodiment of the present disclosure, the resetting/brightness adjustment to the light-emitting element can be implemented periodically only by a periodic control to the signals of the second scanning signal line Gate2 and the light-emitting control signal line EM without a periodic control to the signals of the first scanning signal line Gate1 and the reset control signal line Reset, thereby brightness equalization is realized. As shown in FIG. 4, when the signal of the light-emitting control signal line EM is turned off, the signal of the second scanning signal line Gate2 is turned on, and the anode terminal of the light-emitting element is reset by the signal of the initial signal line INIT, so that a length of a luminance trough in the retention stage is the same as that in the refresh frame, that is, the flicker is eliminated.

In the pixel circuit according to the embodiment of the present disclosure, only three sets of shift registers for the light-emitting control signal line, the first scanning signal line and the second scanning signal line are needed, and the Gate Driver on Array (GOA) circuit formed by cascading has less footprint, which can further reduce the occupation of the display area of the display panel, thereby realizing high resolution and narrow frame of the display device.

The pixel circuit according to the embodiment of the disclosure has simple driving timing, can avoid employing reset external compensation circuit, reduces the use of integrated circuits and reduces the manufacturing cost.

In addition, in the pixel circuit according to the embodiment of the present disclosure, the compensation of the control electrode voltage of the drive sub-circuit is realized by the compensation sub-circuit, which avoids the influence of the threshold voltage drift of the drive sub-circuit on the driving current of the light-emitting element, and improves the uniformity of the display image and the display quality of the display panel.

In an exemplary embodiment, as shown in FIGS. 2 and 3, a pixel circuit according to an embodiment of the present disclosure further includes a first light-emitting control sub-circuit and a second light-emitting control sub-circuit.

The first light-emitting control sub-circuit is connected with the first power line VDD, a light-emitting control signal line EM and the second node N2 respectively, and is configured to write a signal of the first power line VDD to the second node N2 under the control of a signal of the light-emitting control signal line EM.

The second light-emitting control sub-circuit is connected with the light-emitting control signal line EM, the third node N3 and the fourth node respectively, and is configured to form a path between the third node N3 and the fourth node N4 under the control of the signal of the light-emitting control signal line EM.

In an exemplary implementations as shown in FIGS. 2 and 3, one terminal of the light-emitting element is connected with the fourth node N4, and another terminal of the light-emitting element is connected with a second power line VSS.

Figure 5:
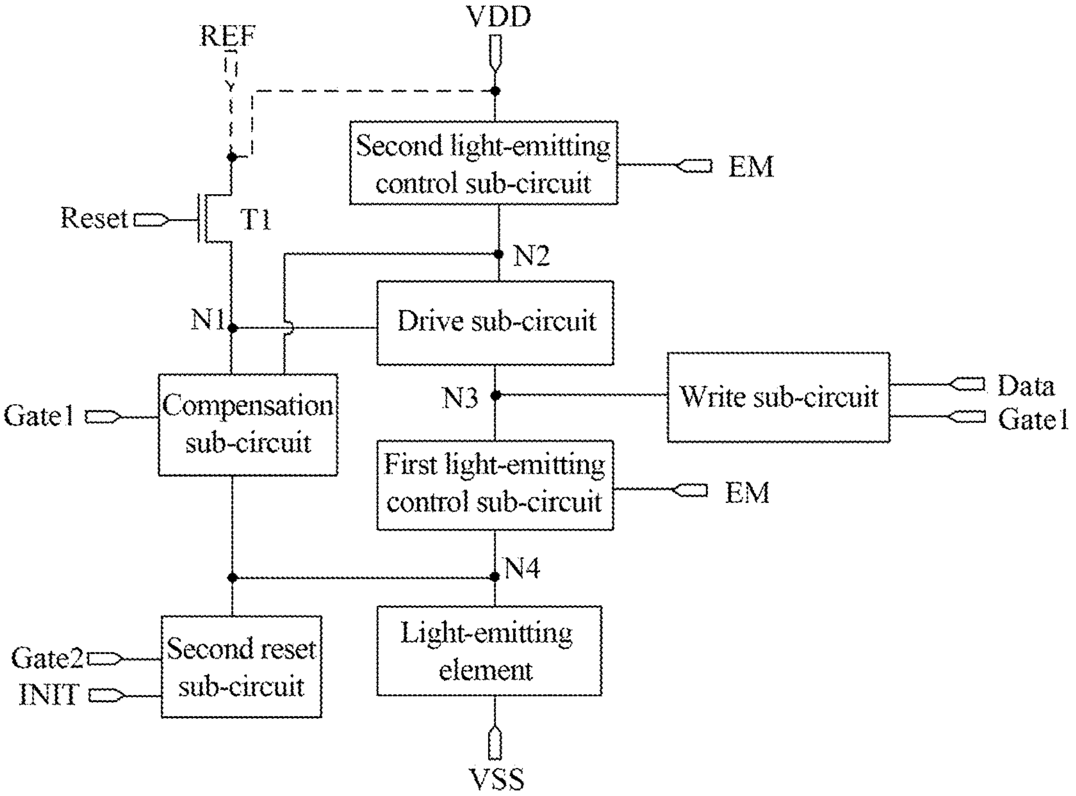
FIG. 5 is an equivalent circuit diagram of a first reset sub-circuit according to an exemplary embodiment of the present disclosure.

In an exemplary embodiment, FIG. 5 is an equivalent circuit diagram of a first reset sub-circuit according to an embodiment of the present disclosure. As shown in FIG. 5, a first reset sub-circuit provided according to an embodiment of the present disclosure includes a first transistor T1.

A control electrode of the first transistor T1 is connected with the reset control signal line Reset, a first electrode of the first transistor T1 is connected with the first power line VDD or the reference power line REF, and a second electrode of the first transistor T1 is connected with the first node N1.

FIG. 5 shows an exemplary structure of a first reset sub-circuit. Those skilled in the art can easily understand that an implementation of the first reset sub-circuit is not limited thereto, as long as a function thereof can be achieved.

Figure 6:
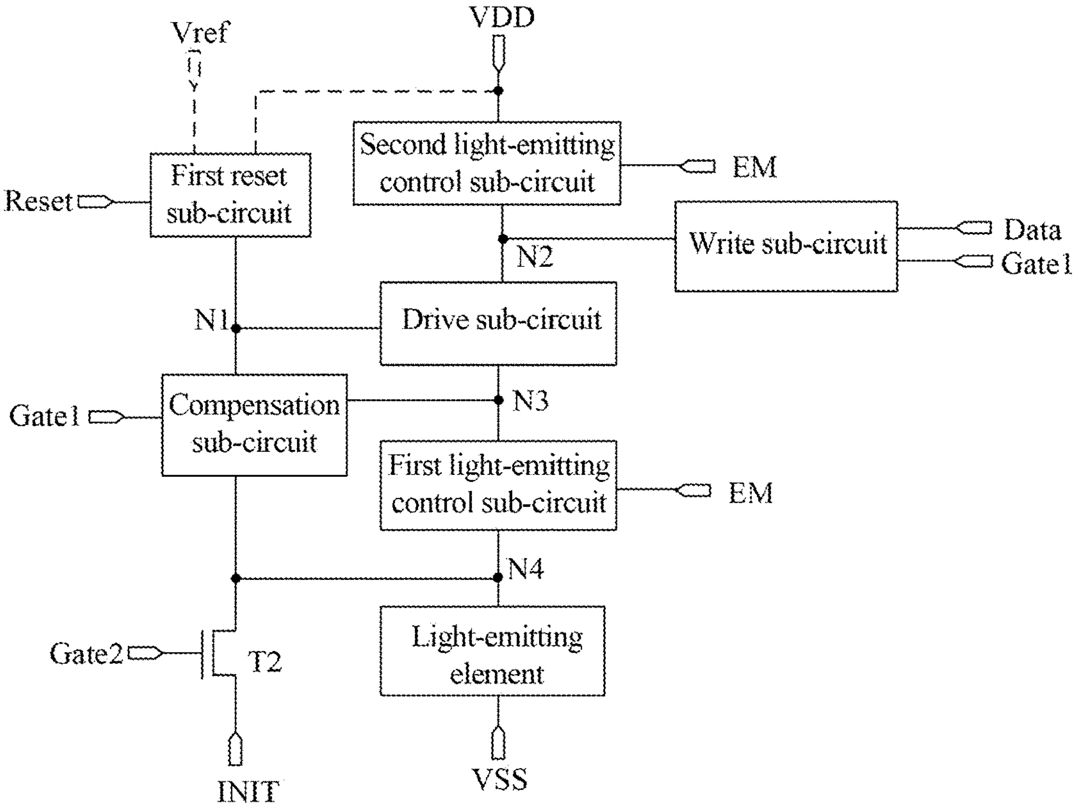
FIG. 6 is an equivalent circuit diagram of a second reset sub-circuit according to an embodiment of the present disclosure.

In an exemplary embodiment, FIG. 6 is an equivalent circuit diagram of a second reset sub-circuit provided according to an embodiment of the present disclosure. As shown in FIG. 6, the second reset sub-circuit according to the embodiment of the present disclosure includes a second transistor T7.

A control electrode of the second transistor T2 is connected with the second scanning signal line Gate2, a first electrode of the first transistor T2 is connected with the initial signal line INIT, and a second electrode of the second transistor T2 is connected with the fourth node N4.

FIG. 6 illustrates an exemplary structure of the second reset sub-circuit. Those skilled in the art can easily understand that an implementation of the second reset sub-circuit is not limited thereto, as long as a function thereof can be achieved.

Figure 7:
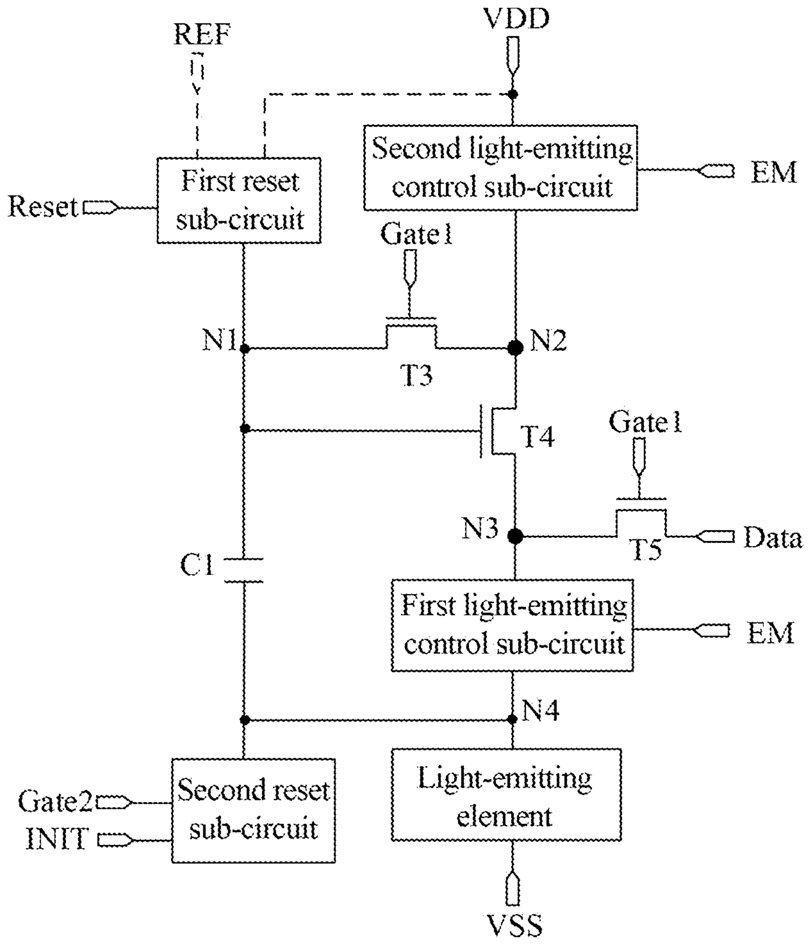
FIG. 7 is an equivalent circuit diagram of a compensation sub-circuit, a drive sub-circuit, and a write sub-circuit according to an embodiment of the present disclosure.

In an exemplary embodiment, FIG. 7 is an equivalent circuit diagram of a drive sub-circuit, a write sub-circuit, and a compensation sub-circuit provided according to an embodiment of the present disclosure. As shown in FIG. 7, the compensation sub-circuit provided according to the embodiment of the present disclosure includes a third transistor T3 and a first capacitor C1, the drive sub-circuit includes a fourth transistor T4, and the write sub-circuit includes a fifth transistor T5.

A control electrode of the third transistor T3 is connected with a first scanning signal line Gate1, a first electrode of the third transistor T3 is connected with a third node N3, and a second electrode of the third transistor T3 is connected with a first node N1.

One terminal of the first capacitor C1 is connected with the first node N1, and another terminal of the first capacitor C1 is connected with a fourth node N4.

A control electrode of the fourth transistor T4 is connected with the first node N1, a first electrode of the fourth transistor T4 is connected with the second node N2, and a second electrode of the fourth transistor T4 is connected with the third node N3.

A control electrode of the fifth transistor T5 is connected with the first scanning signal line Gate1, a first electrode of the fifth transistor T5 is connected with a data signal line Data, and a second electrode of the fifth transistor T5 is connected with the second node N2.

Figure 8:
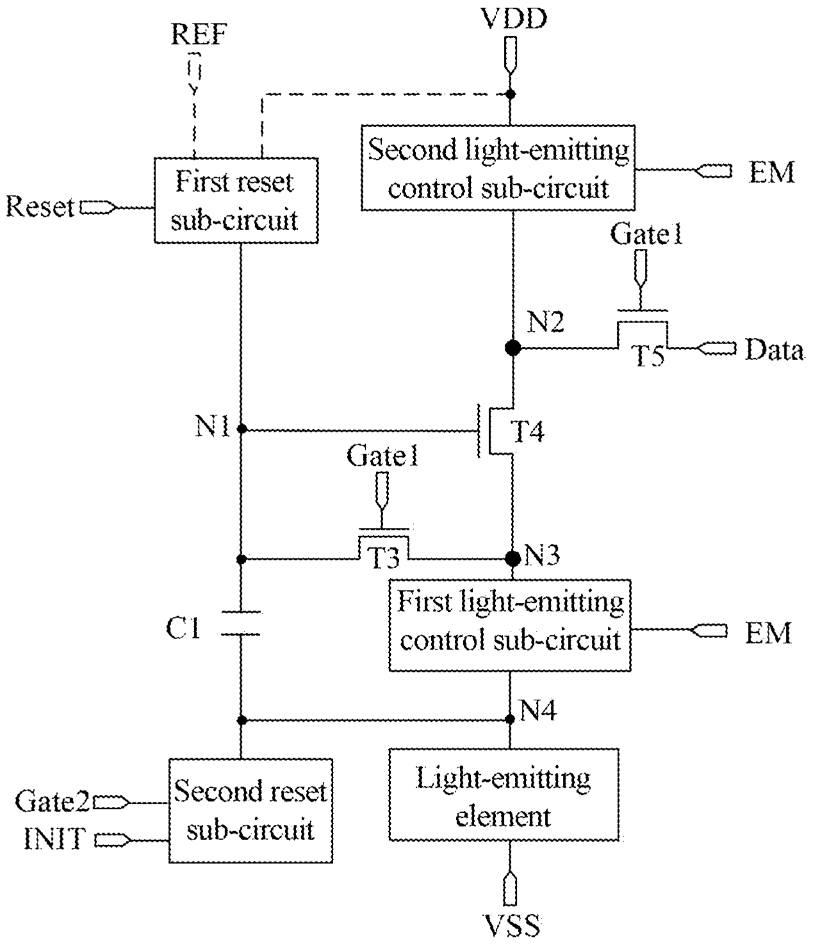
FIG. 8 is another equivalent circuit diagram of a compensation sub-circuit, a drive sub-circuit, and a write sub-circuit according to an embodiment of the present disclosure.

In another exemplary embodiment, FIG. 8 is another equivalent circuit diagram of a drive sub-circuit, a write sub-circuit, and a compensation sub-circuit provided according to an embodiment of the present disclosure. As shown in FIG. 8, the compensation sub-circuit provided according to the embodiment of the present disclosure includes a third transistor T3 and a first capacitor C1, the drive sub-circuit includes a fourth transistor T4, and the write sub-circuit includes a fifth transistor T5.

A control electrode of the third transistor T3 is connected with a first scanning signal line Gate1, a first electrode of the third transistor T3 is connected with a second node N2, and a second electrode of the third transistor T3 is connected with a first node N1.

One terminal of the first capacitor C1 is connected with the first node N1, and another terminal of the first capacitor C1 is connected with a fourth node N4.

A control electrode of the fourth transistor T4 is connected with the first node N1, a first electrode of the fourth transistor T4 is connected with the second node N2, and a second electrode of the fourth transistor T4 is connected with the third node N3.

A control electrode of the fifth transistor T5 is connected with the first scanning signal line Gate1, a first electrode of the fifth transistor T5 is connected with a data signal line Data, and a second electrode of the fifth transistor T5 is connected with the third node N3.

FIGS. 7 and 8 show two exemplary structures of the drive sub-circuit, the write sub-circuit and the compensation sub-circuit. It is easy for those skilled in the art to understand that implementations of the drive sub-circuit, the write sub-circuit and the compensation sub-circuit are not limited thereto as long as functions thereof can be implemented.

Figure 9:
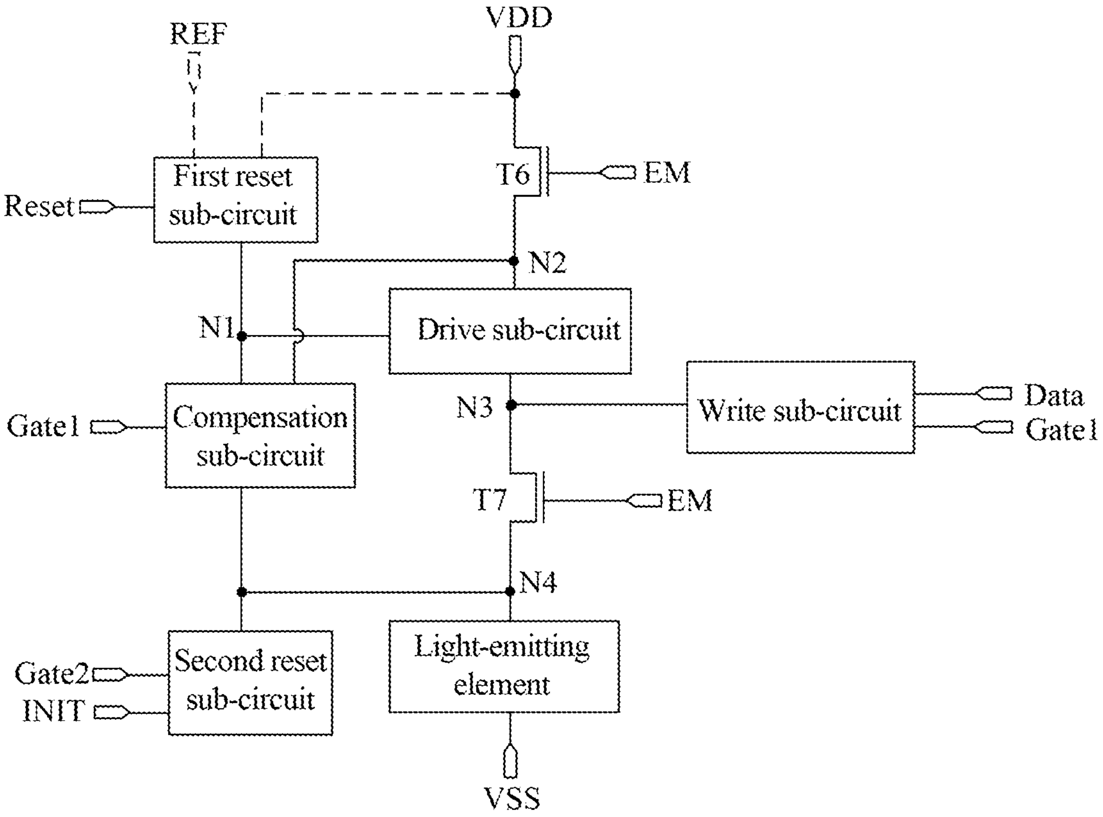
FIG. 9 is an equivalent circuit diagram of a first light-emitting control sub-circuit and a second light-emitting control sub-circuit according to an embodiment of the present disclosure.

In an exemplary embodiment, FIG. 9 is an equivalent circuit diagram of a first light-emitting control sub-circuit and a second light-emitting control sub-circuit provided according to an embodiment of the present disclosure. As shown in FIG. 9, the first light-emitting control sub-circuit provided according to the embodiment of the present disclosure includes a sixth transistor T6 and the second light-emitting control sub-circuit includes a seventh transistor T7.

A control electrode of the sixth transistor T6 is connected with a light-emitting control signal line EM, a first electrode of the sixth transistor T6 is connected with the first power line VDD, and a second electrode of the sixth transistor T6 is connected with the second node N2.

A control electrode of the seventh transistor T7 is connected with the light-emitting control signal line EM, a first electrode of the seventh transistor T7 is connected with a third node N3, and a second electrode of the seventh transistor T7 is connected with a fourth node N4.

FIG. 9 shows an exemplary structure of the first light-emitting control sub-circuit and the second light-emitting control sub-circuit. It is easy for those skilled in the art to understand that implementations of the first light-emitting control sub-circuit and the second light-emitting control sub-circuit are not limited thereto as long as respective functions of them can be achieved.

Figure 10:
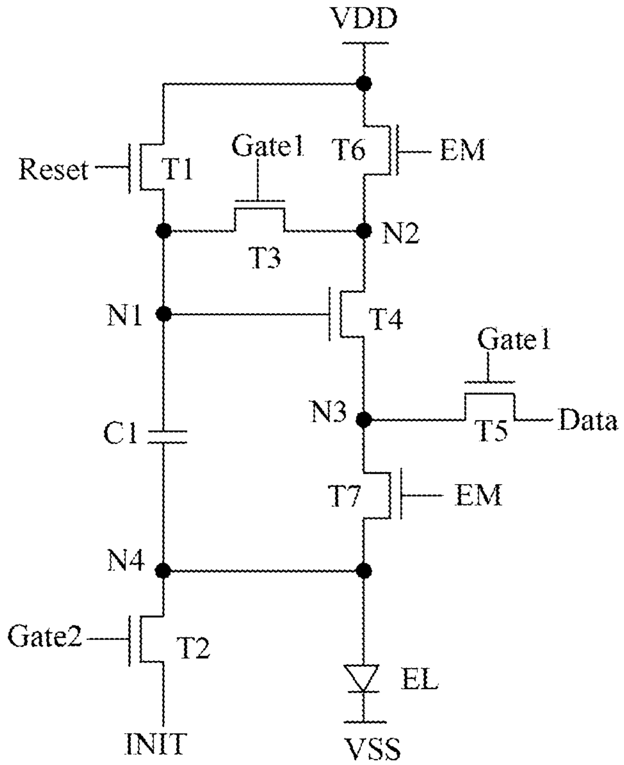
FIG. 10 is an equivalent circuit diagram of a pixel circuit according to an embodiment of the present disclosure.
Figure 11:
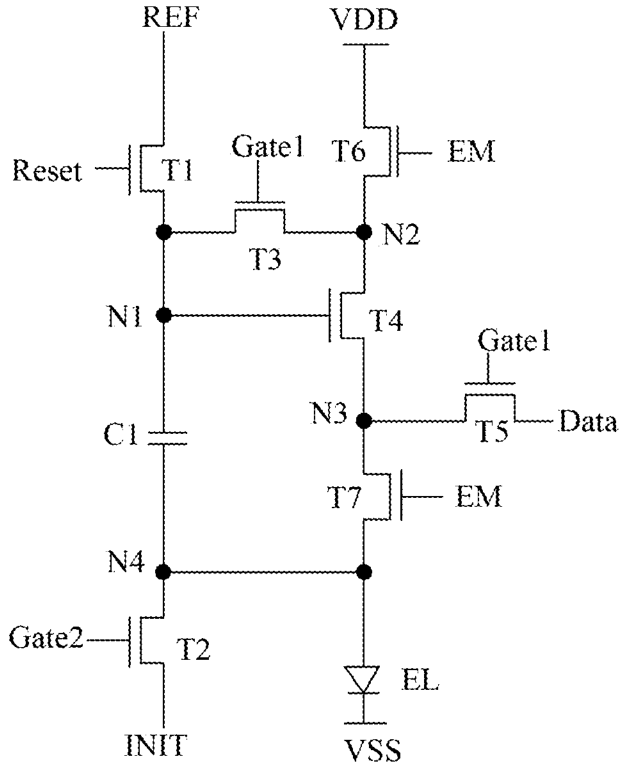
FIG. 11 is another equivalent circuit diagram of a pixel circuit according to an embodiment of the present disclosure.

FIGS. 10 and 11 are two equivalent circuit diagrams of a pixel circuit provided according to an embodiment of the present disclosure. As shown in FIGS. 10 and 11, in the pixel circuit provided according to the embodiment of the present disclosure, a first reset sub-circuit includes a first transistor T1, a second reset sub-circuit includes a second transistor T2, a compensation sub-circuit includes a third transistor T3 and a first capacitor C1, a drive sub-circuit includes a fourth transistor T4, a write sub-circuit includes a fifth transistor T5, a first light-emitting control sub-circuit includes a sixth transistor T6, and a second light-emitting control sub-circuit includes a seventh transistor T7.

A control electrode of the first transistor T1 is connected with the reset control signal line Reset, a first electrode of the first transistor T1 is connected with the first power line VDD or the reference power line REF, and a second electrode of the first transistor T1 is connected with the first node N1.

A control electrode of the second transistor T2 is connected with the second scanning signal line Gate2, a first electrode of the first transistor T2 is connected with the initial signal line INIT, and a second electrode of the second transistor T2 is connected with the fourth node N4.

A control electrode of the third transistor T3 is connected with a first scanning signal line Gate1, a first electrode of the third transistor T3 is connected with a third node N3, and a second electrode of the third transistor T3 is connected with a first node N1.

One terminal of the first capacitor C1 is connected with the first node N1, and another terminal of the first capacitor C1 is connected with a fourth node N4.

A control electrode of the fourth transistor T4 is connected with the first node N1, a first electrode of the fourth transistor T4 is connected with the second node N2, and a second electrode of the fourth transistor T4 is connected with the third node N3.

A control electrode of the fifth transistor T5 is connected with the first scanning signal line Gate1, a first electrode of the fifth transistor T5 is connected with a data signal line Data, and a second electrode of the fifth transistor T5 is connected with the second node N2.

A control electrode of the sixth transistor T6 is connected with a light-emitting control signal line EM, a first electrode of the sixth transistor T6 is connected with the first power line VDD, and a second electrode of the sixth transistor T6 is connected with the second node N2.

A control electrode of the seventh transistor T7 is connected with the light-emitting control signal line EM, a first electrode of the seventh transistor T7 is connected with the third node N3, and a second electrode of the seventh transistor T7 is connected with the fourth node N4.

Figure 12:
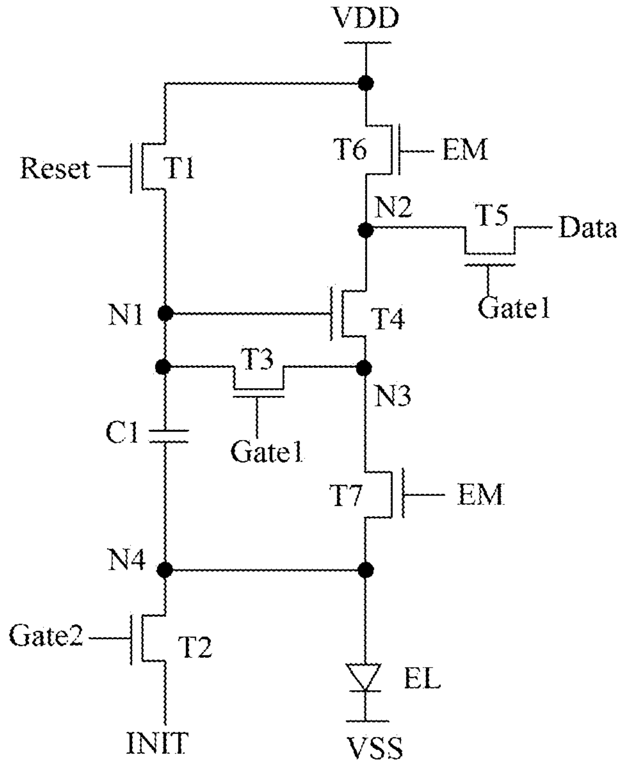
FIG. 12 is yet another equivalent circuit diagram of a pixel circuit according to an embodiment of the present disclosure.
Figure 13:
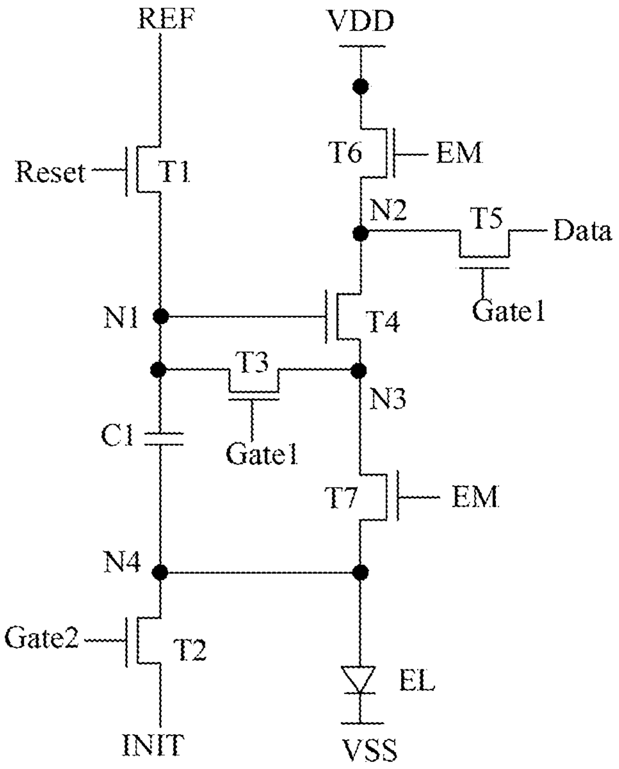
FIG. 13 is yet another equivalent circuit diagram of a pixel circuit according to an embodiment of the present disclosure.

FIGS. 12 and 13 are two other equivalent circuit diagrams of a pixel circuit provided according to an embodiment of the present disclosure. As shown in FIGS. 12 and 13, in the pixel circuit provided according to the embodiment of the present disclosure, a first reset sub-circuit includes a first transistor T1, a second reset sub-circuit includes a second transistor T2, a compensation sub-circuit includes a third transistor T3 and a first capacitor C1, a drive sub-circuit includes a fourth transistor T4, a write sub-circuit includes a fifth transistor T5, a first light-emitting control sub-circuit includes a sixth transistor T6, and a second light-emitting control sub-circuit includes a seventh transistor T7.

A control electrode of the first transistor T1 is connected with the reset control signal line Reset, a first electrode of the first transistor T1 is connected with the first power line VDD or the reference power line REF, and a second electrode of the first transistor T1 is connected with the first node N1.

A control electrode of the second transistor T2 is connected with the second scanning signal line Gate2, a first electrode of the first transistor T2 is connected with the initial signal line INIT, and a second electrode of the second transistor T2 is connected with the fourth node N4.

A control electrode of the third transistor T3 is connected with a first scanning signal line Gate1, a first electrode of the third transistor T3 is connected with a second node N2, and a second electrode of the third transistor T3 is connected with a first node N1.

One terminal of the first capacitor C1 is connected with the first node N1, and another terminal of the first capacitor C1 is connected with a fourth node N4.

A control electrode of the fourth transistor T4 is connected with the first node N1, a first electrode of the fourth transistor T4 is connected with the second node N2, and a second electrode of the fourth transistor T4 is connected with the third node N3.

A control electrode of the fifth transistor T5 is connected with the first scanning signal line Gate1, a first electrode of the fifth transistor T5 is connected with a data signal line Data, and a second electrode of the fifth transistor T5 is connected with the third node N3.

A control electrode of the sixth transistor T6 is connected with a light-emitting control signal line EM, a first electrode of the sixth transistor T6 is connected with the first power line VDD, and a second electrode of the sixth transistor T6 is connected with the second node N2.

A control electrode of the seventh transistor T7 is connected with the light-emitting control signal line EM, a first electrode of the seventh transistor T7 is connected with the third node N3, and a second electrode of the seventh transistor T7 is connected with the fourth node N4.

FIGS. 10 to 13 show exemplary structures of a first reset sub-circuit, a second reset sub-circuit, a drive sub-circuit, a write sub-circuit, a compensation sub-circuit, a first light-emitting control sub-circuit and a second light-emitting control sub-circuit. Those skilled in the art can easily understand that an implementation of each of the above sub-circuits is not limited thereto as long as functions thereof can be implemented.

In an exemplary embodiment, the light-emitting element EL may be an Organic Light-emitting Diode (OLED) or a light-emitting diode of any other type.

In an exemplary embodiment, a first transistor T1 to a seventh transistor T7 are all N-type thin film transistors, or the first transistor T1 to the seventh transistors T7 are all P-type thin film transistors.

In this embodiment, the first transistor T1 to the seventh transistor T7 are all N-type thin film transistors or P-type thin film transistors, which can unify the process flow, reduce the number of the processes, be benefit to improving the yield of products, and a control signal line can be shared by a plurality of transistors in a layout. Moreover, considering that a leakage current of a low-temperature poly silicon thin film transistor is small, all the transistors according to an embodiment of the present invention may be low-temperature poly silicon thin film transistors, preferably. Specifically, a thin film transistor may be selected as a thin film transistor with a bottom gate structure or a thin film transistor with a top gate structure as long as it can realize a switching function.

In an exemplary embodiment, the first capacitor C1 may be a liquid crystal capacitor composed of a pixel electrode and a common electrode, or may be an equivalent capacitor composed of a storage capacitor and a liquid crystal capacitor composed of a pixel electrode and a common electrode, which is not restricted in the present invention.

In an exemplary embodiment, all of the second transistor T2, and the fourth transistor T4 to the seventh transistor T7 are Low Temperature Poly Silicon (LTPS) Thin Film Transistors (TFTs), and the first transistor T1 and the transistor T3 are Indium Gallium Zinc Oxide (IGZO) thin film transistors.

In this embodiment, compared with a low temperature poly silicon thin film transistor, an indium gallium zinc oxide thin film transistor produces less leakage current. Therefore, in the pixel circuit according to the present disclosure, the first transistor T1 and the third transistor T3 are set as indium gallium zinc oxide thin film transistors, so that a leakage current may be significantly reduced, thereby high brightness retention of a light-emitting element may be realized.

In the pixel circuit according to the embodiment of the present disclosure, by connecting the control electrode of the second transistor T2 with the second scanning signal line Gate2, in the low frequency refresh stage, the light-emitting element can be periodically reset/brightness adjusted only by periodically controlling the signals of the light-emitting control signal line EM and the second scanning signal line without periodically controlling the signals of the first scanning signal line Gate1 and the reset control signal line Reset, thereby realizing brightness equalization.

In an exemplary embodiment, the reset control signal line, the first scanning signal line, the light-emitting control signal line and the second scanning signal line are further configured to receive signals at different frequencies according to a display mode of a display panel.

In an exemplary embodiment, receiving the signals at different frequencies according to the display mode of the display panel, includes:

- when the display panel is in a first display mode, a data refresh frequency of the pixel circuit is a first frequency, and signals of the reset control signal line, the first scanning signal line, the light-emitting control signal line, and the second scanning signal line are configured to receive signals at a first frequency;
- when the display panel is in a second display mode, the data refresh frequency of the pixel circuit is a second frequency, the reset control signal line and the first scanning signal line are configured to receive a signal at a second frequency, and the light-emitting control signal line and the second scanning signal line are configured to receive a signal at a third frequency, wherein the third frequency is higher than the second frequency, and the first frequency is higher than the second frequency.

In this embodiment, when the display panel is in the first display mode, the data refresh frequency of the pixel circuit is a first frequency, the reset control signal line is configured to receive a reset control signal at the first frequency, the first scanning signal line is configured to receive a first scan signal at the first frequency, the light-emitting control signal line is configured to receive a light-emitting control signal at the first frequency, and the second scanning signal line is configured to receive a second scan signal at the first frequency.

When the display panel is in the second display mode, the data refresh frequency of the pixel circuit is a second frequency, the reset control signal line is configured to receive a reset control signal at the second frequency, the first scanning signal line is configured to receive a first scan signal at the second frequency, the light-emitting control signal line is configured to receive a light-emitting control signal at the third frequency, and the second scanning signal line is configured to receive a second scan signal at the third frequency.

In an exemplary embodiment, the first display mode is a normal display mode, and the second display mode is a low-frequency display mode or an AOD mode.

In an exemplary embodiment, the first frequency may be 60 Hz or 120 Hz. The second frequency may be 1 Hz or 0.1 Hz. The third frequency may be 60 Hz or 120 Hz.

In an exemplary embodiment, the signal of the reset control signal line Reset and the signal of the first scanning signal line Gate1 are cascaded signals, that is, the signal of the reset control signal line Reset and the signal of the first scanning signal line Gate1 may be from a set of cascaded Gate Driver on Array (GOA) circuits.

Figure 14:
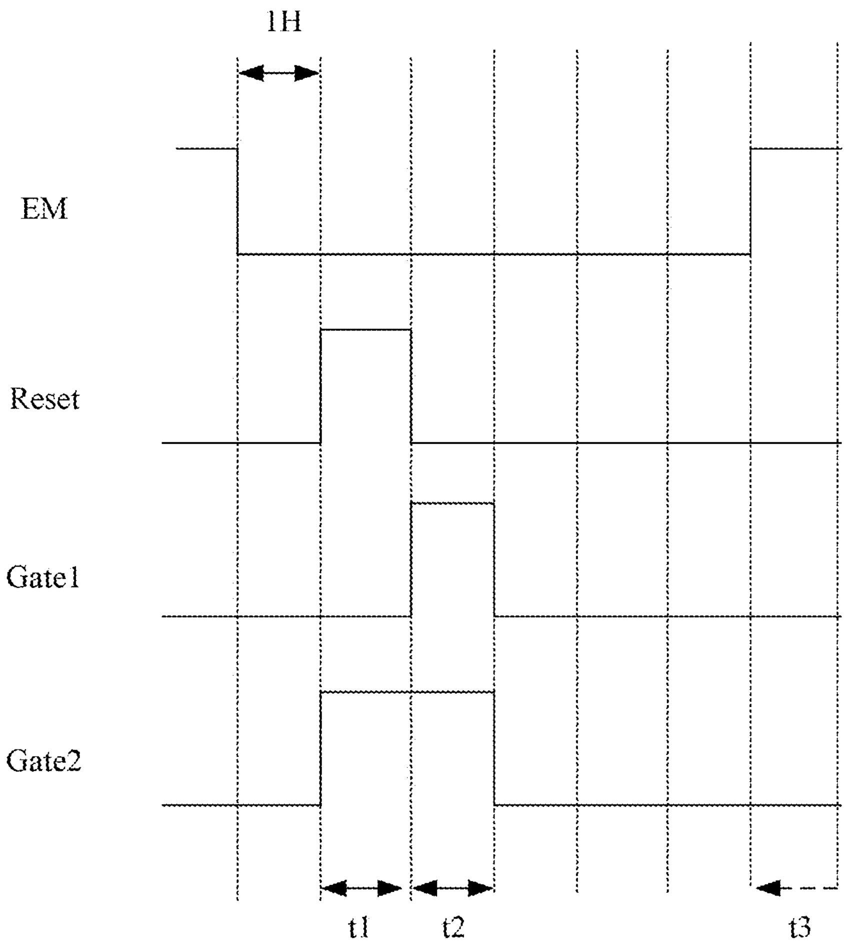
FIG. 14 is an operating timing diagram of the pixel circuits shown in FIGS. 10 to 13 in a normal display mode.

An operating process of a pixel circuit unit in a normal display mode in a period of a frame will be described below in combination with a pixel circuit shown in FIG. 10 and an operating timing diagram shown in FIG. 14 by taking all of a second transistor T2 to a first transistor T1 in a pixel circuit provided according to an embodiment of the present disclosure being N-type thin film transistors as an example, wherein 1H represents a horizontal scanning period. As shown in FIG. 10, the pixel circuit provided in the embodiment of the present disclosure includes seven transistor units (T1 to T7), one capacitor unit (C1), and four power lines (VDD, VSS, Data, and INIT). Wherein, a first power line VDD provides a high-level signal constantly, and a second power line VSS provides a low-level signal constantly. In an exemplary implementation, as shown in FIG. 14, an operating process of the pixel circuit in a normal display mode in a frame period includes:

In a first stage t1, which is referred to a reset stage, signals of a first scanning signal line Gate1 and a light-emitting control signal line are all low-level signals, and signals of a reset control signal line Reset and a second scanning signal line Gate2 are all high-level signals. The low-level signal of the light-emitting control signal line EM turns off the sixth transistor T6 and the seventh transistor T7, the high-level signal of the second scanning signal line Gate2 turns on the second transistor T2, a voltage at the fourth node N4 is reset to an initial voltage supplied by the initial voltage line INIT, and the high-level signal of the reset control signal line Reset turns on the first transistor T1. Therefore, a voltage at the first node N1 is reset to a first voltage Vdd supplied by the first power line VDD, and the low-level signal of the first scanning signal line Gate1 turns off the third transistor T3 and the fifth transistor T5. Since the sixth transistor T6 and the seventh transistor T7 are turned off, a light-emitting element EL does not emit light in this stage.

In a second stage t2, which is referred to as a data writing stage, the signals of the reset control signal line Reset and the light-emitting control signal line EM are low-level signals, and the signals of the first scanning signal line Gate1 and the second scanning signal line Gate2 are high-level signals. The high-level signal of the first scanning signal line Gate1 turns on the fifth transistor T5 and the third transistor T3, and the data signal line Data outputs a data voltage. In this stage, since the first node N1 is at a low level, the fourth transistor T4 is turned on. The data voltage output by the data signal line Data is provided to the first node N1 through the turned-on fifth transistor T5, the third node N3, the turned-on fourth transistor T4, the second node N2, and the turned-on third transistor T3, and the first capacitor C1 is charged with a sum of the data voltage output by the data signal line Data and a threshold voltage of the fourth transistor T4. A voltage at a second terminal (the first node N1) of the first capacitor C1 is Vdata+Vth, wherein Vdata is the data voltage output by the data signal line Data, and Vth is the threshold voltage of the fourth transistor T4. The low-level signal of the light-emitting control signal line EM turns off the sixth transistor T6 and the seventh transistor T7, which makes ensure that the light-emitting element EL does not emit light.

In a third stage t3, which is referred to as a light-emitting stage, the signals of the reset control signal line Reset, the first scanning signal line Gate1 and the second scanning signal line Gate2 are low-level signals, and the signal of the light-emitting control signal line EM is a high-level signal. The high-level signal of the light-emitting control signal line EM turns off the sixth transistor T6 and the seventh transistor T7, the power supply voltage output by the first power line VDD provides a driving voltage to the first electrode (i.e., the fourth node N4) of the light-emitting element EL through the sixth transistor T6, the fourth transistor T4, and the seventh transistor T7 which are all turned on to drive the light-emitting element EL to emit light.

Voltage values at the first node N1 to the fourth node N4 in each stage are shown in Table 1. When the voltage at the fourth node N4 (i.e., the anode of the light-emitting element EL) changes from the initial voltage Vinit supplied by the initial voltage line INIT to the anode voltage Vanode, a difference between the anode voltage Vanode and the initial voltage Vinit is set to X. During this process, the voltages at the first node N1 and the third node N3 also have an amount of change corresponding to X.

TABLE 1

| | t1 | t2 | t3 |
|---|---|---|---|
| N1 | Vdd | Vdata + Vth | Vdata + Vth + X |
| N2 | — | Vdata + Vth | Vdd |
| N3 | — | Vdata | Vinit + X |
| N4 | Vinit | Vinit | Vinit + X |

In a driving process of the pixel circuit, a drive current flowing through the fourth transistor T4 (i.e., a drive transistor) is determined by a voltage difference between a gate electrode and a first electrode of the third transistor T3. Since the voltage at the first node N1 is Vdata+Vth, the drive current of the fourth transistor T4 is as follows.

$$I = K*(Vgs - Vth)^2 = K*[(Vdata + Vth - Vinit) - Vth]^2 = K*[(Vdata - Vinit)]^2$$

I is the drive current flowing through the fourth transistor T4, that is, a drive current for driving the light-emitting element EL, K is a constant, Vgs is a voltage difference between the control electrode and the first electrode of the fourth transistor T4, Vth is a threshold voltage of the fourth transistor T4, Vdata is a data voltage output by the data signal line Data, and Vdd is a power supply voltage output by the first power line VDD.

It may be seen from the above formula that a current I flowing through the light-emitting element EL is unrelated to the threshold voltage Vth of the fourth transistor T4, so that an influence of the threshold voltage Vth of the fourth transistor T4 on the current I is eliminated, and uniformity of brightness is ensured.

Based on the above-mentioned operating timing, the pixel circuit eliminates residual positive charges of the light-emitting element EL after the light-emitting element EL emitted light last time, implements compensation for a gate voltage of a driving transistor, avoids an influence of drift of a threshold voltage of the driving transistor on a driving current of the light-emitting element EL, and improves uniformity of a displayed image and display quality of a display panel.

Figure 15:
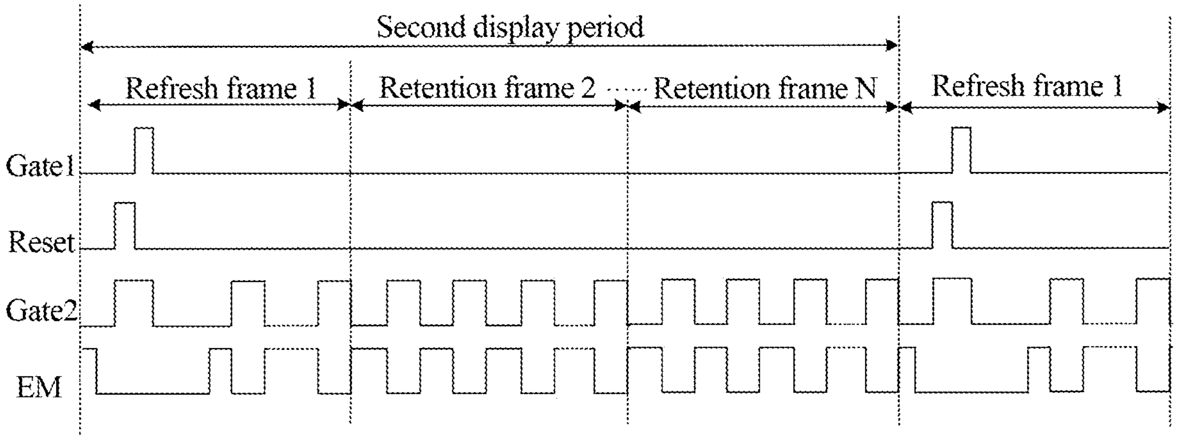
FIG. 15 is an operation timing diagram of the pixel circuit shown in FIGS. 10 to 13 in a low frequency display mode.

As shown in FIG. 15, in a low-frequency display mode, one display period is divided into one refresh frame stage and a plurality of retention frame stages. The refresh frame is a picture refresh frame, i.e., a data update frame. In a retention frame, data are held. The data are locked at the first node N1 (the control electrode of the drive thin film transistor), and are not refreshed. However, in order to keep flickering invisible, the light-emitting element EL usually needs to be continuously reset to achieve a display frequency of 60 Hz or above. Therefore, in a retention frame stage, an anode of the light-emitting element EL may also be reset according to a frequency of 60 Hz or above, that is, the light-emitting control signal line EM needs to be continuously refreshed.

As shown in FIG. 15, the first scanning signal line Gate1, the reset control signal line Reset and the data signal line Data are in cooperation for low-frequency refreshing, and pixels are refreshed row by row only in the refresh frame stage. The light-emitting control signal line EM and the second scanning signal line are still refreshed row by row at 60 Hz or 120 Hz, thereby implementing the high-frequency refresh of the light-emitting element EL and alleviating the flickering caused by a brightness difference of the light-emitting element EL at data refresh moments. Since the signal of the first scanning signal line Gate1 and the reset control signal line Reset share a set of Gate Drivers on Array (GOA). Moreover, the signals of the first scanning signal line Gate1 and the reset control signal line Reset are both kept unchanged in a low frequency retention frame stage, which makes sure that the Gate Driver on Array (GOA) circuit of the first scanning signal line Gate1 and the reset control signal line Reset is not refreshed in the low frequency retention frame stage, and the power consumption is reduced.

When the display frequency is 60 Hz, 1/60 s may be used for updating data (a timing includes the above-mentioned reset stage, data writing stage, light-emitting stage, etc.), and the remaining 59/60 s may be used for holding data (timing sequences include sequentially repeated light-emitting stages and light-off stages), that is, timings of control signals in the remaining 59/60 s are the same as those of the control signals in the retention frame stage. According to this method, the picture is updated every 1 minute.

Figure 16:
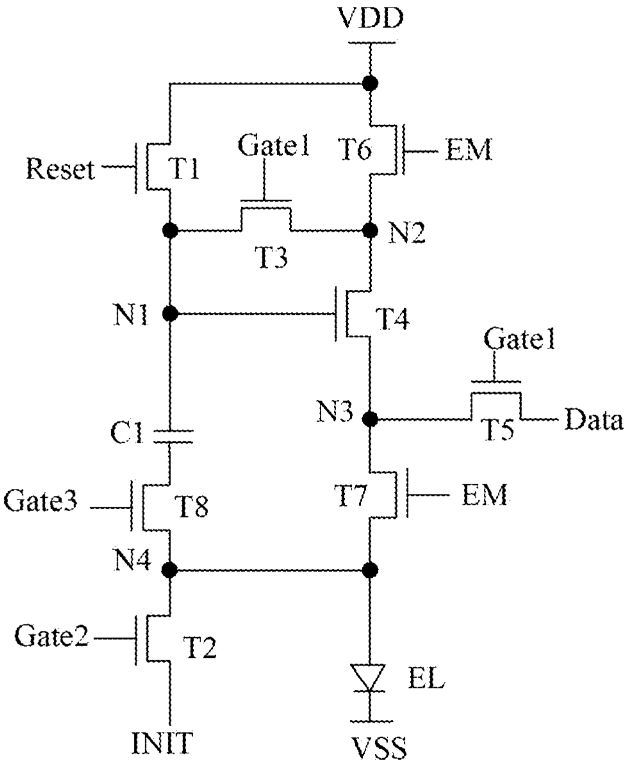
FIG. 16 is yet another equivalent circuit diagram of a pixel circuit according to an embodiment of the present disclosure.

In another exemplary embodiment, FIG. 16 is another equivalent circuit diagram according to an embodiment of the present disclosure. As shown in FIG. 16, in the pixel circuit according to the embodiment of the present disclosure, the second reset sub-circuit includes a second transistor T2 and an eighth transistor T8.

One terminal of the first capacitor C1 is connected with the first node N1, and another terminal of the first capacitor C1 is connected with a second electrode of the eighth transistor T8.

A control electrode of the second transistor T2 is connected with the second scanning signal line Gate2, a first electrode of the first transistor T2 is connected with the initial signal line INIT, and a second electrode of the second transistor T2 is connected with the fourth node N4.

A control electrode of the eighth transistor T8 is connected with the third scanning signal line Gate3, and a first electrode of the eighth transistor T8 is connected with the fourth node N4.

FIG. 16 shows another exemplary structure of a second reset sub-circuit. Compared with the pixel circuits according to the above-mentioned embodiments, the pixel circuit shown in FIG. 16 is equivalent to the addition of the eighth transistor T8 to the pixel circuit shown in FIG. 10. It will be readily understood by those skilled in the art that a configuration of the second reset sub-circuit according to the present embodiment is also applicable to the pixel circuits shown in FIGS. 11, 12 and 13.

In an exemplary embodiment, in the normal display mode, the signal of the third scanning signal line Gate3 is the same as the signal of the second scanning signal line Gate2, the signal of the third scanning signal line Gate3 is the same as the signal of the light-emitting control signal line EM in the retention frame stage, or the third scanning signal line Gate3 constantly supplies a low-level signal so that the eighth transistor T8 is turned off in the retention frame stage.

Figure 17:
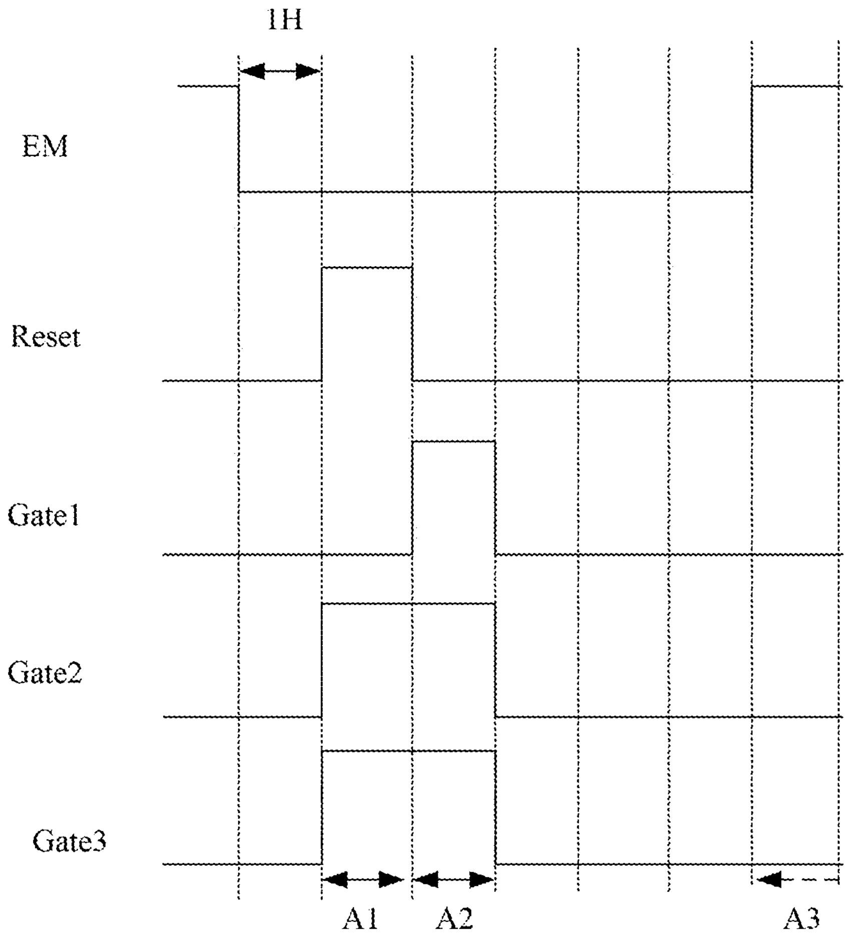
FIG. 17 is an operating timing diagram of the pixel circuit shown in FIG. 16 in a normal display mode.

In an exemplary implementation, as shown in FIG. 17, an operating process of the pixel circuit as shown in FIG. 16 in the normal display mode in a frame period includes a first stage A1, a second stage A2 and a third stage A3.

In the first stage A1, which is referred to a reset stage, signals of a first scanning signal line Gate1 and a light-emitting control signal line are all low-level signals, and signals of a reset control signal line Reset, a second scanning signal line Gate2 and a third scanning signal line Gate3 are all high-level signals. The low-level signal of the light-emitting control signal line EM turns off the sixth transistor T6 and the seventh transistor T7, the high-level signal of the second scanning signal line Gate2 turns on the second transistor T2, the high-level signal of the third scanning signal line Gate3 turns on the eighth transistor T8, voltages at the fourth node N4 and a first terminal of the first capacitor C1 (a lower plate of the first capacitor C1) are reset to an initial voltage supplied by the initial voltage line INIT, and the high-level signal of the reset control signal line Reset turns on the first transistor T1. Therefore, a voltage at the first node N1 is reset to a first voltage Vdd supplied by the first power line VDD, and the low-level signal of the first scanning signal line Gate1 turns off the third transistor T3 and the fifth transistor T5. Since the sixth transistor T6 and the seventh transistor T7 are turned off, the light-emitting element EL does not emit light in this stage.

In the second stage A2, which is referred to as a data writing stage, the signals of the reset control signal line Reset and the light-emitting control signal line EM are low-level signals, and the signals of the first scanning signal line Gate1, the second scanning signal line Gate2 and the third scanning signal line Gate3 are high-level signals. The high-level signal of the first scanning signal line Gate1 turns on the fifth transistor T5 and the third transistor T3, and the data signal line Data outputs a data voltage. In this stage, since the first node N1 is at a low level, the fourth transistor T4 is turned on. The data voltage output by the data signal line Data is provided to the first node N1 through the turned-on fifth transistor T5, the third node N3, the turned-on fourth transistor T4, the second node N2, and the turned-on third transistor T3, and the first capacitor C1 is charged with a sum of the data voltage output by the data signal line Data and a threshold voltage of the fourth transistor T4. A voltage at the second terminal (the first node N1) of the first capacitor C1 is Vdata+Vth, where Vdata is the data voltage output by the data signal line Data, and Vth is the threshold voltage of the fourth transistor T4. The low-level signal of the light-emitting control signal line EM turns off the sixth transistor T6 and the seventh transistor T7, which makes ensure that the light-emitting element EL does not emit light.

In the third stage t3, which is referred to as a light-emitting stage, the signals of the reset control signal line Reset, the first scanning signal line Gate1, the second scanning signal line Gate2 and the third scanning signal line Gate3 are all low-level signals, and the signal of the light-emitting control signal line EM is a high-level signal. The high-level signal of the light-emitting control signal line EM turns off the sixth transistor T6 and the seventh transistor T7, the power supply voltage output by the first power line VDD provides a driving voltage to the first electrode (i.e., the fourth node N4) of the light-emitting element EL through the sixth transistor T6, the fourth transistor T4, and the seventh transistor T7 which are all turned on to drive the light-emitting element EL to emit light.

Figure 18:
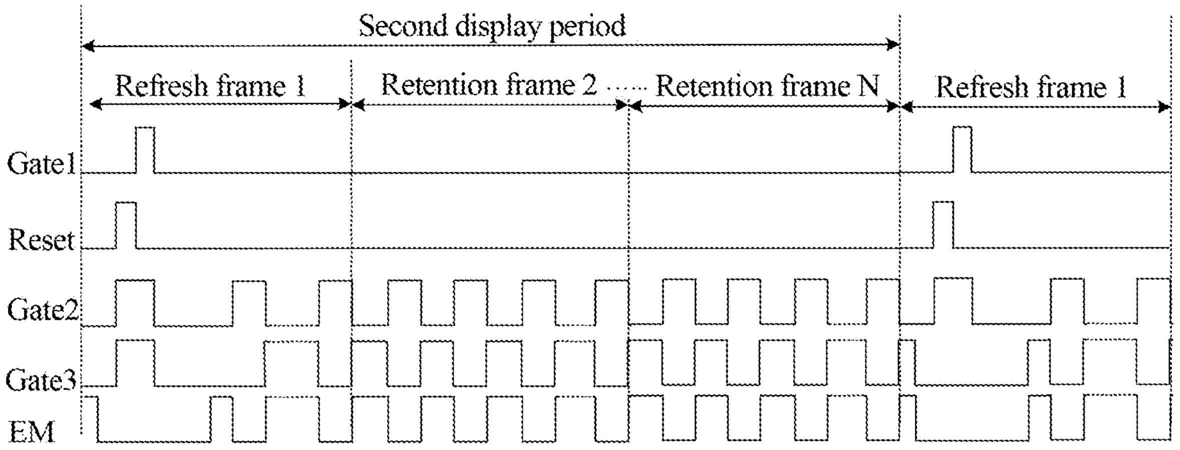
FIG. 18 is an operation timing diagram of the pixel circuit shown in FIG. 16 in a low frequency display mode.

As shown in FIG. 18, the first scanning signal line Gate1, the reset control signal line Reset and the data signal line Data are in cooperation for low-frequency refreshing, and pixels are refreshed row by row only in the refresh frame stage. The light-emitting control signal line EM the second scanning signal line Gate2 and the third scanning signal line Gate3 are still refreshed row by row at 60 Hz or 120 Hz, thereby implementing the high-frequency refresh of the light-emitting element EL and alleviating the flickering caused by a brightness difference of the light-emitting element EL at data refresh moments. Since the signal of the first scanning signal line Gate1 and the reset control signal line Reset share a set of Gate Drivers on Array (GOA). Moreover, the signals of the first scanning signal line Gate1 and the reset control signal line Reset are both kept unchanged in a low frequency retention frame stage, which makes sure that the Gate Driver on Array (GOA) circuit of the first scanning signal line Gate1 and the reset control signal line Reset is not refreshed in the low frequency retention frame stage, and the power consumption is reduced. In this embodiment, since the signal of the second scanning signal line Gate2 and the signal of the third scanning signal line Gate3 are opposite in the retention frame stage, the second reset sub-circuit (the second transistor T2 and the eighth transistor T8) is turned off, the voltage at the first terminal of the first capacitor C1 (the lower plate of the first capacitor C1) is not affected by the initial signal line INIT. In other exemplary embodiments, the third scanning signal line Gate3 may also constantly provide a low-level signal in the retention frame stage so that the eighth transistor T8 is turned off in the retention frame stage, and the voltage at the first terminal of the first capacitor C1 (the lower plate of the first capacitor C1) may also be unaffected by the initial signal line INIT.

In the present embodiment, the eighth transistor T8 functions as a barrier transistor to prevent from periodically turning on the second transistor T2 due to the signal of the second scanning signal line during the retention frame stage, thereby prevent from the voltage at the first terminal of the first capacitor C1 (the lower plate of the first capacitor C1) from being periodically reset.

A driving method of a pixel circuit is also provided according to some embodiments of the present disclosure, which is applied to the pixel circuit provided according to the preceding embodiments. The pixel circuit operates in a first display mode or a second display mode. The first display mode includes a plurality of first display periods. In one of the plurality of first display periods, the driving method therefor includes the following acts.

In a reset stage, a first reset sub-circuit resets a first node under a control of a signal of a reset control signal line; and a second reset sub-circuit resets an anode terminal of a light-emitting element under a control of a signal of a second scanning signal line.

In a data writing stage, a write sub-circuit writes a signal of a data signal line to a second node or a third node under a control of a signal of the first scanning signal line, and a compensation sub-circuit compensates a voltage at the first node under a control of a signal of the first scanning signal line.

In a light-emitting stage, a drive sub-circuit provides a drive signal to the third node in response to signals at the first node and the second node. Exemplarily, the drive signal is a drive current.

In an exemplary embodiment, the driving method further includes the following acts.

In the light-emitting stage, a first light-emitting control sub-circuit write a signal of a first power line to the second node under a control of a signal of a light-emitting control signal line, and a second light-emitting control sub-circuit forms a current path between the third node and the fourth node under the control of the signal of the light-emitting control signal line.

In an exemplary embodiment, in the second display mode, a plurality of second display periods are included, one of which includes one refresh stage and a plurality of retention stages.

The refresh stage includes a reset stage, a data writing stage and a light-emitting stage which are arranged sequentially.

The retention stage includes a light-emitting stage and a light-off stage, which are arranged at intervals.

In the light-off stage, the second reset sub-circuit resets the anode terminal of the light-emitting element under the control of the signal of the second scanning signal line.

In an exemplary embodiment, the first display mode may be a normal display mode, and the second display mode may be a low-frequency display mode or an AOD mode.

In an exemplary embodiment, the first frequency may be 60 Hz or 120 Hz. The second frequency may be 1 Hz or 0.1 Hz. The third frequency may be 60 Hz or 120 Hz.

An embodiment of the present disclosure further provides a display apparatus, which includes the pixel circuit provided in the above-mentioned embodiment. The display apparatus of the present disclosure may be any product or component with a display function, such as a mobile phone, a tablet computer, a television, a display, a laptop computer, a digital photo frame, or a navigator. In an exemplary implementation, the display apparatus may be a wearable display apparatus, which can be worn on a human body in some manners, such as a smart watch, a smart bracelet, etc.

Following points need to be noted.

The drawings of the embodiments of the present disclosure only involve structures involved in the embodiments of the present disclosure, and other structures may refer to conventional designs.

The embodiments of the present disclosure, i.e., features in the embodiments, may be combined with each other to obtain new embodiments if there is no conflict.

Although the embodiments disclosed in the present disclosure are as above, the described contents are only embodiments used for convenience of understanding the present disclosure and are not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A pixel circuit, comprising a drive sub-circuit, a write sub-circuit, a compensation sub-circuit, a first reset sub-circuit, a second reset sub-circuit and a light-emitting element, wherein the drive sub-circuit is configured to provide a drive signal to a third node in response to signals at a first node and a second node;

the write sub-circuit is configured to write a signal of a data signal line to the second node or the third node under a control of a signal of a first scanning signal line;

the compensation sub-circuit is configured to compensate a voltage at the first node under the control of the signal of the first scanning signal line;

the first reset sub-circuit is configured to reset the first node under a control of a signal of a reset control signal line; and the second reset sub-circuit is configured to reset an anode terminal of the light-emitting element under a control of a signal of a second scanning signal line, wherein the compensation sub-circuit comprises a third transistor and a first capacitor, the drive sub-circuit comprises a fourth transistor, and the write sub-circuit comprises a fifth transistor;

a control electrode of the third transistor is connected with the first scanning signal line, a first electrode of the third transistor is connected with the second node, and a second electrode of the third transistor is connected with the first node;

one terminal of the first capacitor is connected with the first node, and another terminal of the first capacitor is connected with the anode terminal of the light-emitting element;

a control electrode of the fourth transistor is connected with the first node, a first electrode of the fourth transistor is connected with the second node, and a second electrode of the fourth transistor is connected with the third node; and a control electrode of the fifth transistor is connected with the first scanning signal line, a first electrode of the fifth transistor is connected with the data signal line, and a second electrode of the fifth transistor is connected with the third node.

2. The pixel circuit according to claim 1, further comprising a first light-emitting control sub-circuit and a second light-emitting control sub-circuit, wherein the first reset sub-circuit comprises a first transistor and the second reset sub-circuit a second transistor; the compensation sub-circuit comprises a third transistor and a first capacitor, the drive sub-circuit comprises a fourth transistor, the write sub-circuit comprises a fifth transistor, the first light-emitting control sub-circuit comprises a sixth transistor, and the second light-emitting control sub-circuit comprises a seventh transistor;

a control electrode of the first transistor is connected with the reset control signal line, a first electrode of the first transistor is connected with a first power line or a reference power line, and a second electrode of the first transistor is connected with the first node;

a control electrode of the second transistor is connected with the second scanning signal line, a first electrode of the second transistor is connected with an initial signal line, and a second electrode of the second transistor is connected with a fourth node, and the fourth node is connected with the anode terminal of the light-emitting element;

a control electrode of the third transistor is connected with the first scanning signal line, a first electrode of the third transistor is connected with the second node, and a second electrode of the third transistor is connected with the first node;

a terminal of the first capacitor is connected with the first node, and another terminal of the first capacitor is connected with the fourth node;

a control electrode of the fourth transistor is connected with the first node, a first electrode of the fourth transistor is connected with the second node, and a second electrode of the fourth transistor is connected with the third node;

a control electrode of the fifth transistor is connected with the first scanning signal line, a first electrode of the fifth transistor is connected with the data signal line, and a second electrode of the fifth transistor is connected with the third node;

a control electrode of the sixth transistor is connected with the light-emitting control signal line, a first electrode of the sixth transistor is connected with the first power line, and a second electrode of the sixth transistor is connected with the second node; and a control electrode of the seventh transistor is connected with the light-emitting control signal line, a first electrode of the seventh transistor is connected with the third node, and a second electrode of the seventh transistor is connected with the fourth node.

3. The pixel circuit according to claim 2, wherein the first transistor to the seventh transistor are all N-type transistors or P-type transistors.

4. The pixel circuit according to claim 2, wherein all of the second transistor, and the fourth transistor to the seventh transistor are low temperature poly silicon thin film transistors, and both of the first transistor and the third transistor are indium gallium zinc oxide thin film transistors.

5. The pixel circuit according to claim 1, further comprising: a first light-emitting control sub-circuit and a second light-emitting control sub-circuit, wherein the first light-emitting control sub-circuit is configured to write a signal of a first power line to the second node under a control of a signal of a light-emitting control signal line; and the second light-emitting control sub-circuit is configured to form a current path between the third node and the anode terminal of the light-emitting element under the control of the signal of the light-emitting control signal line.

6. The pixel circuit according to claim 5, wherein the first light-emitting control sub-circuit comprises a sixth transistor, and the second light-emitting control sub-circuit comprises a seventh transistor;

a control electrode of the sixth transistor is connected with the light-emitting control signal line, a first electrode of the sixth transistor is connected with the first power line, and a second electrode of the sixth transistor is connected with the second node; and a control electrode of the seventh transistor is connected with the light-emitting control signal line, a first electrode of the seventh transistor is connected with the third node, and a second electrode of the seventh transistor is connected with the anode terminal of the light-emitting element.

7. The pixel circuit according to claim 1, wherein the reset control signal line, the first scanning signal line, and the second scanning signal line are further configured to receive signals at different frequencies according to a display mode of a display panel.

8. The pixel circuit according to claim 7, wherein receiving the signals at different frequencies according to the display mode of the display panel comprises:

when the display panel is in a first display mode, a data refresh frequency of the pixel circuit is a first frequency, and the reset control signal line, the first scanning signal line and the second scanning signal line are configured to receive signals at a first frequency; and when the display panel is in a second display mode, the data refresh frequency of the pixel circuit is a second frequency, the reset control signal line and the first scanning signal line are configured to receive a signal at a second frequency, and the second scanning signal line is configured to receive a signal at a third frequency, wherein the third frequency is higher than the second frequency, and the first frequency is higher than the second frequency.

9. The pixel circuit according to claim 1, further comprising a first light-emitting control sub-circuit and a second light-emitting control sub-circuit, wherein the first reset sub-circuit comprises a first transistor and the second reset sub-circuit a second transistor and an eighth transistor; the compensation sub-circuit comprises a third transistor and a first capacitor, the drive sub-circuit comprises a fourth transistor, the write sub-circuit comprises a fifth transistor, the first light-emitting control sub-circuit comprises a sixth transistor, and the second light-emitting control sub-circuit comprises a seventh transistor;

a control electrode of the first transistor is connected with the reset control signal line, a first electrode of the first transistor is connected with a first power line or a reference power line, and a second electrode of the first transistor is connected with the first node;

a control electrode of the second transistor is connected with the second scanning signal line, a first electrode of the second transistor is connected with an initial signal line, and a second electrode of the second transistor is connected with a fourth node, and the fourth node is connected with the anode terminal of the light-emitting element;

a control electrode of the third transistor is connected with the first scanning signal line, a first electrode of the third transistor is connected with the second node, and a second electrode of the third transistor is connected with the first node;

one terminal of the first capacitor is connected with the first node, and another terminal of the first capacitor is connected with a second electrode of the eighth transistor;

a control electrode of the eighth transistor is connected with a third scanning signal line, and a first electrode of the eighth transistor is connected with the fourth node;

a control electrode of the fourth transistor is connected with the first node, a first electrode of the fourth transistor is connected with the second node, and a second electrode of the fourth transistor is connected with the third node;

a control electrode of the fifth transistor is connected with the first scanning signal line, a first electrode of the fifth transistor is connected with the data signal line, and a second electrode of the fifth transistor is connected with the third node;

a control electrode of the sixth transistor is connected with the light-emitting control signal line, a first electrode of the sixth transistor is connected with the first power line, and a second electrode of the sixth transistor is connected with the second node; and a control electrode of the seventh transistor is connected with the light-emitting control signal line, a first electrode of the seventh transistor is connected with the third node, and a second electrode of the seventh transistor is connected with the fourth node.

10. The pixel circuit according to claim 9, wherein when a display panel is in a refresh stage, a signal of the third scanning signal line is the same as a signal of the second scanning signal line; and when the display panel is in a retention stage, the signal of the third scanning signal line is opposite to the signal of the second scanning signal line; or, when the display panel is in the retention stage, the signal of the third scanning signal line turns off the eighth transistor constantly.

11. A driving method of a pixel circuit, used for driving a pixel circuit according to claim 1, wherein the pixel circuit operates in a first display mode or a second display mode, the first display mode comprises a plurality of first display periods, in one of the plurality of first display periods, the driving method comprises:

in a reset stage, resetting, by a first reset sub-circuit, a first node under a control of a signal of a reset control signal line; and resetting, by a second reset sub-circuit, an anode terminal of a light-emitting element under a control of a signal of a second scanning signal line;

in a data writing stage, writing, by a write sub-circuit, a signal of a data signal line to a second node or a third node under a control of a signal of a first scanning signal line, and compensating, by a compensation sub-circuit, a voltage at the first node under the control of the signal of the first scanning signal line; and in a light-emitting stage, providing, by a drive sub-circuit, a drive signal to the third node in response to signals of the first node and the second node.

12. The method according to claim 11, wherein the second display mode comprises a plurality of second display periods, wherein the second display period comprises a refresh stage and a retention stage;

the refresh stage comprises a reset stage, a data writing stage and a light-emitting stage which are arranged sequentially;

the retention stage comprises a plurality of light-emitting stages and a plurality of light-off stages, which are arranged at intervals; and in the light-off stage, the second reset sub-circuit resets the anode terminal of the light-emitting element under the control of the signal of the second scanning signal line.

13. The pixel circuit according to claim 1, wherein the first reset sub-circuit comprises a first transistor; and a control electrode of the first transistor is connected with the reset control signal line, a first electrode of the first transistor is connected with a first power line or a reference power line, and a second electrode of the first transistor is connected with the first node.

14. The pixel circuit according to claim 1, wherein the second reset sub-circuit comprises a second transistor; and a control electrode of the second transistor is connected with the second scanning signal line, a first electrode of the second transistor is connected with an initial signal line, and a second electrode of the second transistor is connected with the anode terminal of the light-emitting element.

15. The pixel circuit according to claim 1, wherein the signal of the first reset control signal line and the signal of the first scanning signal line are cascaded signals.

16. The pixel circuit according to claim 1, wherein the second reset sub-circuit comprises a second transistor and an eighth transistor;

a control electrode of the second transistor is connected with the second scanning signal line, a first electrode of the second transistor is connected with an initial signal line, and a second electrode of the second transistor is connected with the anode terminal of the light-emitting element; and a control electrode of the eighth transistor is electrically connected with a third scanning signal line, a first electrode of the eighth transistor is electrically connected with an anode terminal of the light-emitting element, and a second electrode of the eighth transistor is electrically connected with the compensation sub-circuit.

17. A display apparatus, comprising the pixel circuit according to claim 1.

* * * * *